(12) United States Patent
Chaganti et al.

(10) Patent No.: US 11,271,804 B2
(45) Date of Patent: Mar. 8, 2022

(54) HYPER-CONVERGED INFRASTRUCTURE COMPONENT EXPANSION/REPLACEMENT SYSTEM

(71) Applicant: Dell Products L.P., Round Rock, TX (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/012,173

(22) Filed: Sep. 4, 2020

(65) Prior Publication Data

US 2020/0403857 A1    Dec. 24, 2020

Related U.S. Application Data

(63) Continuation-in-part of application No. 16/258,469, filed on Jan. 25, 2019, now Pat. No. 10,778,520.

(51) Int. Cl.
*H04L 12/24* (2006.01)
*G06F 16/23* (2019.01)
*H04L 41/0803* (2022.01)
*H04L 41/085* (2022.01)
*G06F 9/455* (2018.01)

(52) U.S. Cl.
CPC ...... *H04L 41/0803* (2013.01); *G06F 16/2379* (2019.01); *H04L 41/085* (2013.01); *G06F 9/45541* (2013.01)

(58) Field of Classification Search
CPC ... H04L 12/24; H04L 41/082; H04L 41/0893; H04L 41/0856; H04L 41/085; H04L 41/0803; H04L 41/0806; H04L 41/0809; H04L 41/0813; H04L 41/0816; H04L 41/0873; G06F 16/2379; G06F 9/50; G06F 11/30
See application file for complete search history.

(56) References Cited

U.S. PATENT DOCUMENTS

| 9,325,688 | B1 | 4/2016 | Hansen et al. |
| 9,626,211 | B2 | 4/2017 | Riewrangboonya et al. |
| 10,078,465 | B1 * | 9/2018 | Wu ..................... G06F 3/0635 |

(Continued)

*Primary Examiner* — Sargon N Nano
(74) *Attorney, Agent, or Firm* — Joseph Mencher

(57) ABSTRACT

A networked system may include an HCI component expansion/replacement system that is coupled to an HCI system and that periodically updates an HCI system solution database to identify a validated components for an HCI system platform that includes the HCI system, and validated software for each of the validated components. When the HCI component expansion/replacement system receives a request for a new component type to be provided in the HCI system, existing component information about a plurality of existing components that are included in the HCI system is retrieved and used to identify a first validated component that is identified in the HCI system solution database for the HCI system platform that includes the HCI system. The HCI component expansion/replacement system then provides the first validated software that is identified in the HCI system solution database for the first validated component to the HCI system.

20 Claims, 25 Drawing Sheets

(56) References Cited

U.S. PATENT DOCUMENTS

| | | | |
|---|---|---|---|
| 10,169,064 B2 * | 1/2019 | Riewrangboonya | ........................ H04L 41/0816 |
| 10,476,951 B2 | 11/2019 | Gakhar et al. | |
| 11,095,730 B1 * | 8/2021 | Chaganti | .................. G06F 9/547 |
| 11,140,029 B1 * | 10/2021 | Singhal | .................. H04L 67/34 |
| 2014/0280489 A1 | 9/2014 | Nandyalam et al. | |
| 2015/0312104 A1 * | 10/2015 | Riewrangboonya | ........................ H04L 41/0813 709/224 |
| 2017/0149931 A1 * | 5/2017 | Lochhead | ........... H04L 41/0896 |
| 2018/0173452 A1 * | 6/2018 | Hu | ........................ G06F 3/0629 |
| 2018/0189109 A1 * | 7/2018 | Nagai | .................. G06F 9/5077 |
| 2018/0365064 A1 * | 12/2018 | Gakhar | .................. G06F 9/505 |
| 2018/0367607 A1 * | 12/2018 | Gakhar | ............... H04L 41/0668 |
| 2019/0007369 A1 | 1/2019 | Nirwal et al. | |
| 2019/0068698 A1 * | 2/2019 | Kumar | .................. G06F 9/5088 |
| 2019/0087278 A1 | 3/2019 | Almog | |
| 2019/0138360 A1 * | 5/2019 | Devireddy | ............ G06F 9/5044 |
| 2019/0340005 A1 | 11/2019 | Mace et al. | |
| 2020/0019841 A1 | 1/2020 | Shaabana et al. | |
| 2020/0042416 A1 * | 2/2020 | Satoyama | ........... G06F 11/3055 |
| 2020/0077535 A1 * | 3/2020 | Mekad | ................. H05K 7/1438 |
| 2020/0133657 A1 * | 4/2020 | Yan | ........................ G06F 3/064 |
| 2020/0244521 A1 * | 7/2020 | Patel | .................. G06F 11/3062 |
| 2020/0344325 A1 * | 10/2020 | Sarisky | ................. H04L 41/082 |
| 2020/0403857 A1 * | 12/2020 | Chaganti | ............. H04L 41/0803 |
| 2021/0064234 A1 * | 3/2021 | Zhang | .................. G06F 9/5016 |
| 2021/0105322 A1 * | 4/2021 | Sakashita | ............ H04L 41/0806 |

\* cited by examiner

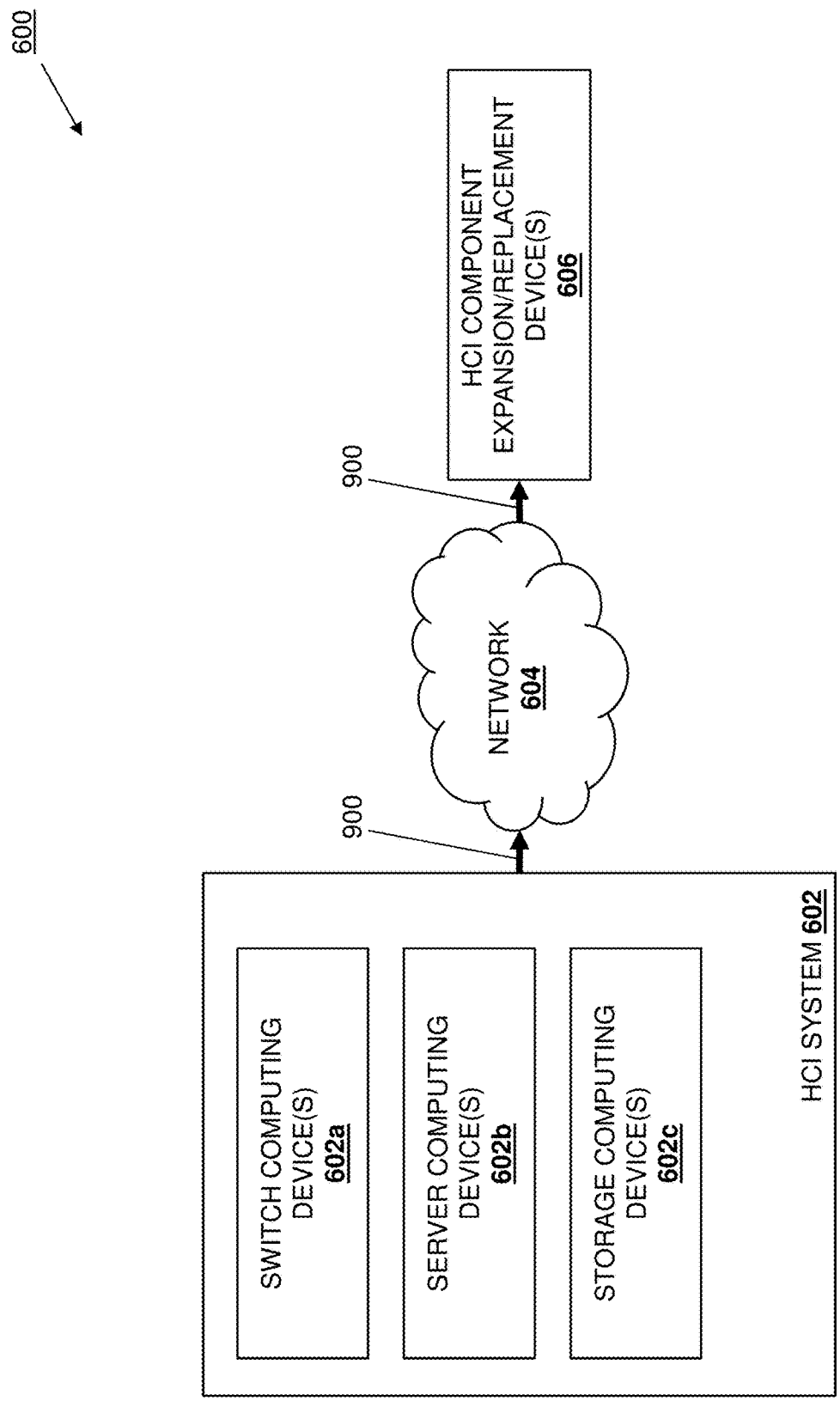

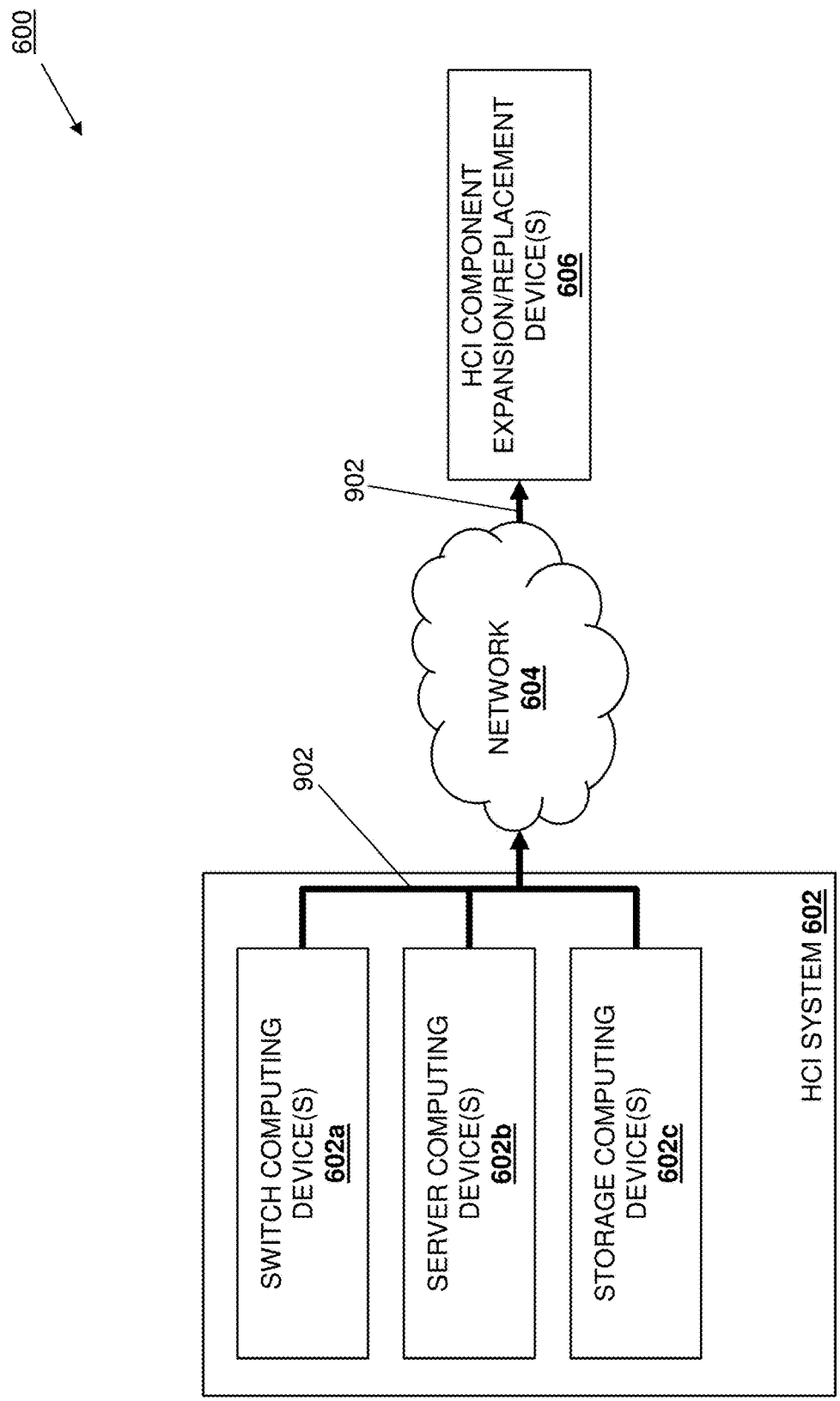

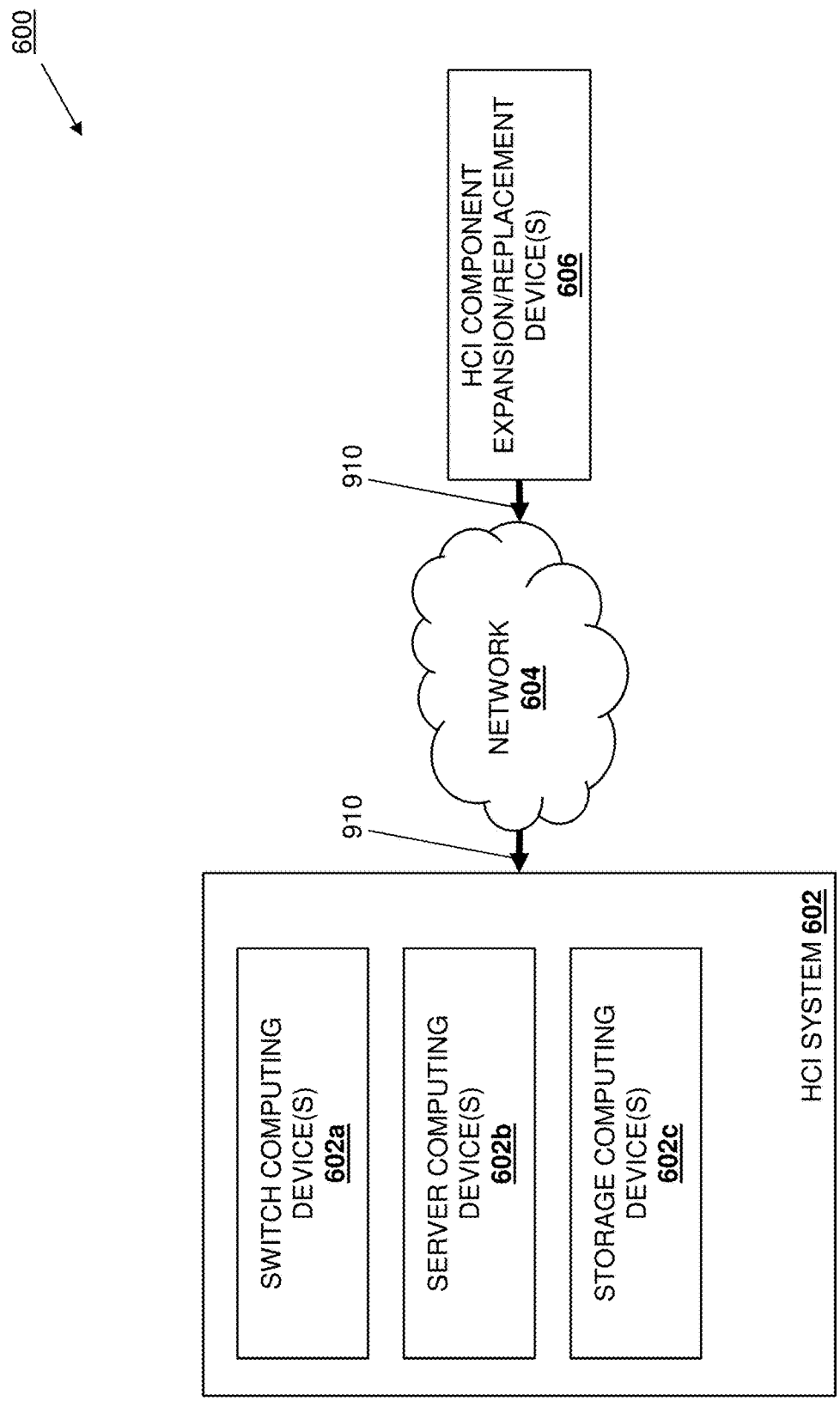

HYPER-CONVERGED INFRASTRUCTURE COMPONENT EXPANSION/REPLACEMENT SYSTEM

CROSS-REFERENCE TO RELATED APPLICATIONS

The present disclosure is a continuation-in-part of U.S. patent application Ser. No. 16/258,469, filed on Jan. 25, 2019, the disclosure of which is incorporated by reference herein in its entirety.

BACKGROUND

The present disclosure relates generally to information handling systems, and more particularly to expanding or replacing components in information handling systems that provide a Hyper-Converged Infrastructure (HCI) system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A growing trend with information handling systems is to replace traditional physical information handling system infrastructures with software-defined information handling system infrastructures. For example, traditional physical information handling system infrastructures typically include physical server device(s), physical networking devices (e.g., physical switch devices), and physical storage devices, and can be replaced by software-defined information handling system infrastructures such as Hyper-Converged Infrastructure (HCI) systems that utilize physical server devices to provide software-defined entities that perform the compute, networking, and storage functionality provided by the physical devices included in the traditional physical information handling system infrastructures. The use of HCI systems tend to reduce costs associated with traditional physical information handling system infrastructures, while offering flexibility and on-demand scaling of the infrastructure with little to no disruptions the services provided by those infrastructures.

However, HCI systems are configurable from a wide variety of HCI components in order to provide different HCI solutions having a variety of resiliency levels, supported configurations, and node requirements that enable desired levels of capacity and scale points. As the number of HCI system components available to provide HCI systems grows, it become increasingly difficult to correlate HCI system needs with any particular traditional physical information handling system infrastructure in order to provide an HCI system that meets the requirements of that traditional physical information handling system infrastructure while also providing an optimal configuration and cost of that HCI system. The inventors of the present disclosure describe techniques for correlating HCI system needs with physical information handling system infrastructure in U.S. patent application Ser. No. 16/258,469, filed on Jan. 25, 2019, the disclosure of which is incorporated by reference herein in its entirety.

At the time of initial ordering of an HCI system that correlates with the needs of a physical information handling system infrastructure, validation rules may be enforced to optimize the components provided in that HCI system. For example, such validation rules may include cache-to-capacity ratio rules that ensure a particular cache-to-capacity ratio (e.g., 10%) is maintained (e.g., if utilizing a hybrid configuration), capacity drive rules that identify how many capacity drives are required (e.g., based on a multiple of cache drives), storage mixing rules that specify that storage device mixing (e.g., the mixing of Serial Attached Small Computer System Interface (SCSI) (SAS) storage devices and Serial AT Attachment (SATA) drives) is not allowed, memory population rules that ensure that all memory channels get populated (e.g., to optimize memory performance), network card rules that require all network cards to come from a particular network card vendor/provider, operating system rules that enforce or ignore validation rules based on the operating system being utilized (e.g., the WINDOWS® Server 2016 operating system may require the enforcement of validation rules that are not required when using the WINDOWS® Server 2019 operating system), and/or other validation rules that would be apparent to one of skill in the art in possession of the present disclosure.

As will be appreciated by one of skill in the art in possession of the present disclosure, while the correlation techniques described by the inventors of the present disclosure allow validation rules like those discussed above to be enforced upon the initial order of an HCI system by a customer in order to ensure that HCI system includes a fully supported configuration, when a customer expands or replaces components in their HCI system, issues can result if the new components are not configured to operate optimally with the existing components (e.g., software-defined solutions may require uniform numbers and/or types of components across all the nodes in the HCI system). Furthermore, replacement components that are identical to failed components, and/or expansion components that are identical to components originally provided with the HCI system, may no longer be available (e.g., storage devices originally provided with the HCI system may no longer be shipping, processing systems originally provided with the HCI system may have been upgraded by the manufacturer, etc.) The consideration of such issues when components in an HCI system are expanded or replaced is difficult and time consuming, and can result in the expansion or replacement of components in the HCI system that results in sub-optimal operation of the HCI system.

Accordingly, it would be desirable to provide an HCI component expansion/replacement system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Hyper-Converged Infrastructure (HCI) component expansion/replacement engine that is configured to: periodically update an HCI system solution database to identify a plurality of validated components for an HCI system platform that includes an HCI system, and to identify validated software for each of the plurality of validated components; receive a request for a new component type to be provided in the HCI system; retrieve, from the HCI system in response to receiving the request, existing component information about a plurality of existing components that are included in the HCI system; identify, in the HCI system solution database based on the existing component information, a first validated component that corresponds to the new component type and that is identified for the HCI system platform that includes the HCI system; and provide, to the HCI system, the first validated software that is identified in the HCI system solution database for the first validated component.

BRIEF DESCRIPTION OF THE DRAWINGS

FIG. 9A is a schematic view illustrating an embodiment of the networked system of FIG. 6 operating during the method of FIG. 8.

FIG. 9B is a schematic view illustrating an embodiment of the networked system of FIG. 6 operating during the method of FIG. 8.

FIG. 9G is a schematic view illustrating an embodiment of the networked system of FIG. 6 operating during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
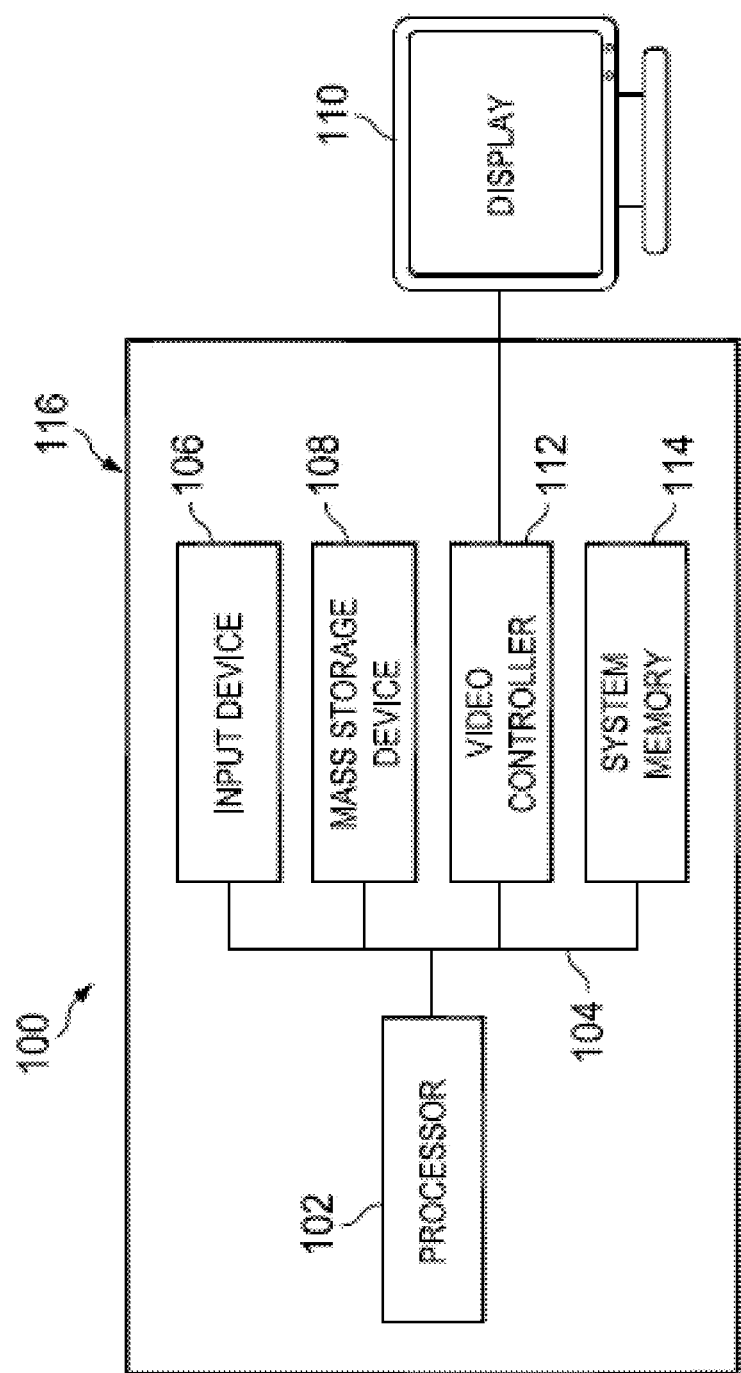
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
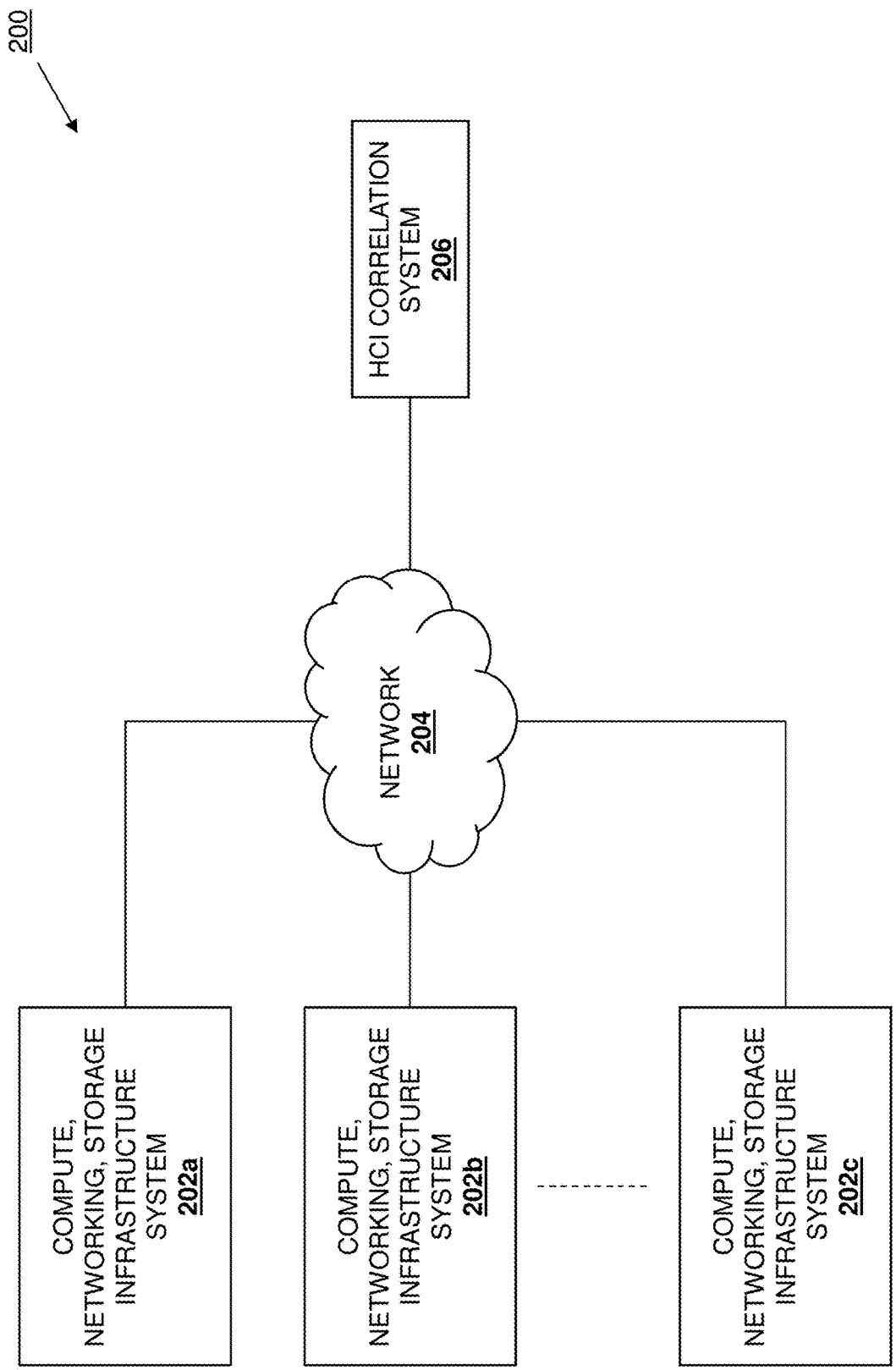
FIG. 2 is a schematic view illustrating an embodiment of a Hyper-Converged Infrastructure (HCI) correlation system coupled to computer/networking/storage infrastructure systems.

Referring now to FIG. 2, an embodiment of a networked system 200 is illustrated. In the illustrated embodiment, the networked system 200 includes a plurality of compute/networking/storage infrastructure systems 202a, 202b, and up to 202c. For example, any or all of the compute/networking/storage infrastructure systems 202a-c may be provided by traditional physical information handling system infrastructures that typically include physical server device(s), physical networking devices (e.g., physical switch devices), and physical storage devices that have been interconnected and configured (e.g., via software) to perform a variety of tasks desired by the user of that computer, networking, and storage infrastructure system. As such, any of the compute/networking/storage infrastructure systems 202a-c may include one or more IHSs similar to the IHS 100 discussed above with reference to FIG. 1, and/or including some or all of the components of the IHS 100. In specific examples, any of the compute/networking/storage infrastructure systems 202a-c may be provided by server device (s), networking device(s), and storage device(s) housed in one or more racks. However, one of skill in the art in possession of the present disclosure will recognize that compute/networking/storage infrastructure systems 202a-c provided via traditional physical information handling system infrastructures may include a variety of different components in a variety of different component configurations while remaining within the scope of the present disclosure as well.

In the illustrated embodiment, each of the compute/networking/storage infrastructure systems 202a-c are coupled to a network 204, which may be provided by a Local Area Network (LAN), the Internet, and/or other networks known in the art. In the examples below, each of the compute/networking/storage infrastructure systems 202a-c may be controlled by different users, although other embodiments may provide the multiple compute/networking/storage infrastructure systems 202a-c illustrated in FIG. 2 controlled by a single user. An HCI correlation system 206 is coupled to the network 204, and may be provided by the IHS 100 discussed above with reference to FIG. 1, and/or may include some or all of the components of the IHS 100. In specific examples, the HCI correlation system may be provided by a plurality of server devices, although the use of other components for providing the HCI correlation system 206 is envisioned as falling within the scope of the present disclosure as well.

While a specific networked system 200 has been described, one of skill in the art in possession of the present disclosure will recognize that a variety of infrastructure systems may benefit from the HCI correlations discussed below, and those infrastructure systems will fall within the scope of the present disclosure as well. Furthermore, while the correlation of HCI systems with compute/networking/storage infrastructure systems is illustrated and described below, one of skill in the art in possession of the present disclosure will recognize how the systems and methods described herein may be utilized to correlate Converged Infrastructure (CI) systems (e.g., all-in-one physical infrastructure systems including compute devices, networking devices, and storage devices) with existing compute/networking/storage infrastructure systems while remaining within the scope of the present disclosure as well. Furthermore, while the provisioning of HCI systems that provide functionality available from the compute/networking/storage infrastructure systems is described below, the provisioning of HCI systems or CI systems for new functionality, or the expansion of existing functionality, will fall within the scope of the present disclosure as well.

Figure 3:
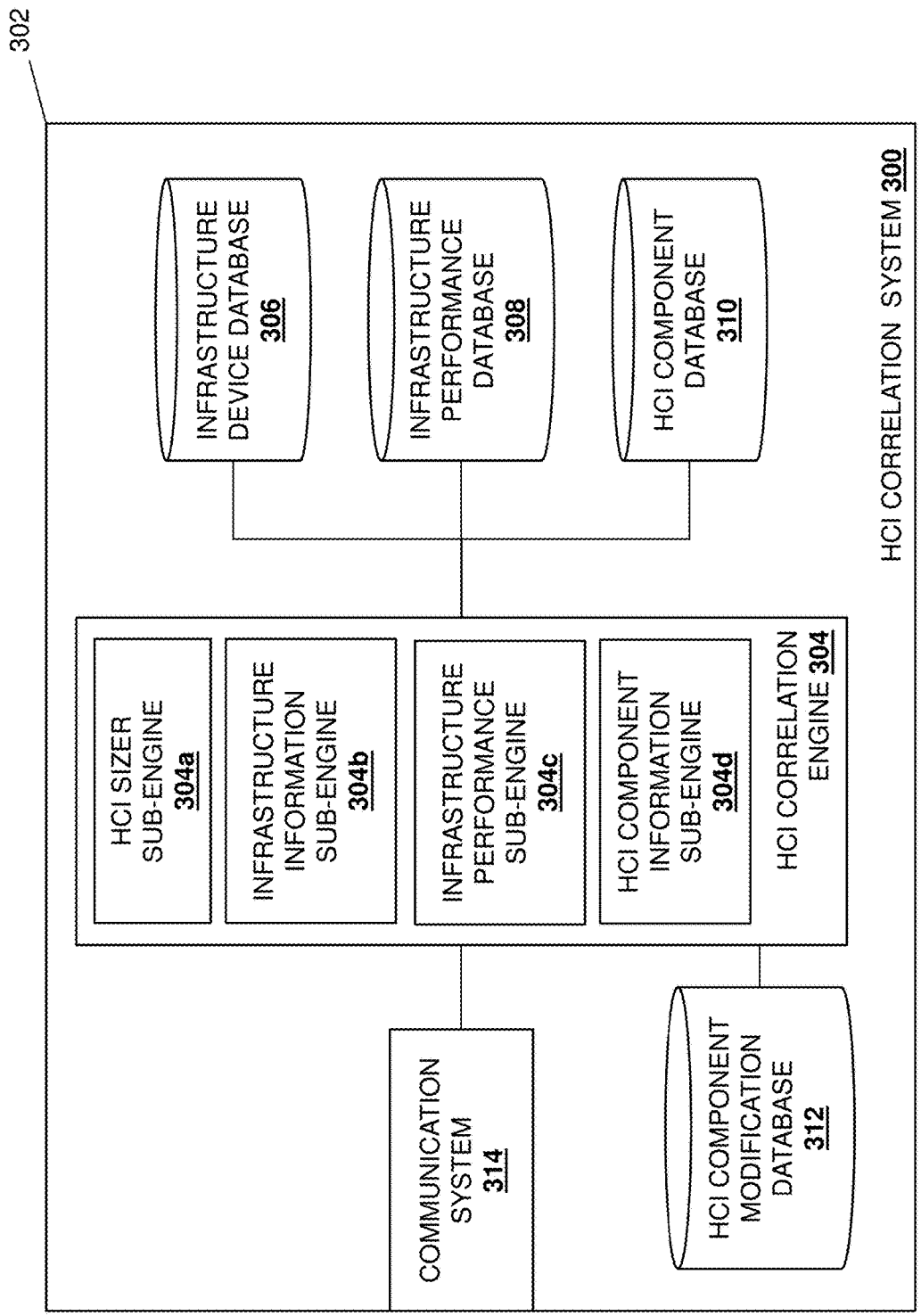
FIG. 3 is a schematic view illustrating an embodiment of the HCI correlation system included in FIG. 2.

Referring now to FIG. 3, an embodiment of an HCI correlation system 300 is illustrated that may provide the HCI correlation system 206 discussed above with reference to FIG. 2. As such, the HCI correlation system 300 may be provided by the IHS 100 discussed above with reference to FIG. 2, may include some or all of the components of the IHS 100, and in specific embodiments may be provided by one or more server devices. In the illustrated embodiment, the HCI correlation system 300 includes a chassis 302 that houses the components of the HCI correlation system 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI correlation engine 304 that is configured to perform the functions of the HCI correlation engines and HCI correlation systems discussed below.

As discussed in further detail below, the HCI correlation engine 304 may be configured to perform data collection, data analytics, HCI component identification, HCI component modification analysis, and/or any of the other HCI correlation functionality discussed below. In some of the specific examples below, the HCI correlation engine 304 is configured to utilize formulas and/or algorithms that specify and apply weightings and/or prioritizations to variety HCI component parameters that drive the identification of HCI components in order to provide for the creation of an HCI system that provides required and/or desired capabilities while also conforming to HCI component positioning strategies. As would be understood by one of skill in the art in possession of the present disclosure, HCI component positioning strategies may influence the HCI component identifications made via the HCI component identification algorithm discussed below, and may be defined by an HCI provider to position or prioritize HCI components for identification based on, for example, current system requirements, component quotas, and component provider partnering, and/or any other component positioning strategy factors that would be apparent to one of skill in the art in possession of the present disclosure. Furthermore, the modification of identified HCI components for providing any particular HCI system may be captured and analyzed to identify when the weighting/prioritizations of HCI components in the formulas and/or algorithms discussed herein should be changed in order to direct the identification of HCI components for HCI systems created in the future.

In the specific example illustrated in FIG. 3, the HCI correlation engine 304 includes an HCI sizer sub-engine 304a that is configured to perform the functions of the HCI sizer engines, HCI correlations engines, and HCI correlation systems discussed below; an infrastructure information sub-engine 304b that is configured to perform the functions of the infrastructure information engines, HCI correlations engines, and HCI correlation systems discussed below; an infrastructure performance sub-engine 304c that is configured to perform the functions of the infrastructure performance engines, HCI correlations engines, and HCI correlation systems discussed below; and an HCI component information sub-engine 304d that is configured to perform the functions of the HCI component information engines, HCI correlations engines, and HCI correlation systems discussed below. However, while specific sub-engines are illustrated in FIG. 3 and described as providing specific functionality below, any of the functionality discussed below may be provided by the HCI correlation engine 304 and/or HCI correlation system 300 while remaining within the scope of the present disclosure as well.

The chassis 302 may also house a storage system (not illustrated, but which may include the storage device 108 discussed above with reference to FIG. 1) that is coupled to the HCI correlation engine 304 (e.g., via a coupling between the storage system and the processing system) and that may include databases that store any of the information utilized by the HCI correlation engine 304 as discussed below. For example, in the illustrated embodiment, the storage system includes an infrastructure device database 306, an infrastructure performance database 308, an HCI component database 310, and an HCI component modification database 312. However, while particular databases are described as storing particular information below, one of skill in the art in possession of the present disclosure will recognize that the storage system may store any of the information utilized by the HCI correlation engine 304 as discussed below in any of a variety of manners that will fall within the scope of the present disclosure as well. The chassis 302 may also house a communication system 314 that is coupled to the HCI correlation engine 304 (e.g., via a coupling between the communication system 314 and the processing system) and that may be provided by a Network Interface Controller (NIC), a wireless communication subsystem (e.g., a BLUETOOTH® subsystem, a Near Field Communication (NFC) subsystem, a WiFi communication subsystem, etc.), and/or any other communication components that would be apparent to one of skill in the art in possession of the present disclosure. While a specific HCI correlation system 300 has been illustrated and described, one of skill in the art in possession of the present disclosure will recognize that an HCI correlation system provided according to the teachings of the present disclosure may be provided by a variety of components and/or components configurations that will fall within the scope of the present disclosure as well. Furthermore, while referred to as an "HCI correlation system", the HCI correlations discussed herein may be provided by an HCI correlation service running on any of a variety of hardware known in the art.

Figure 4:
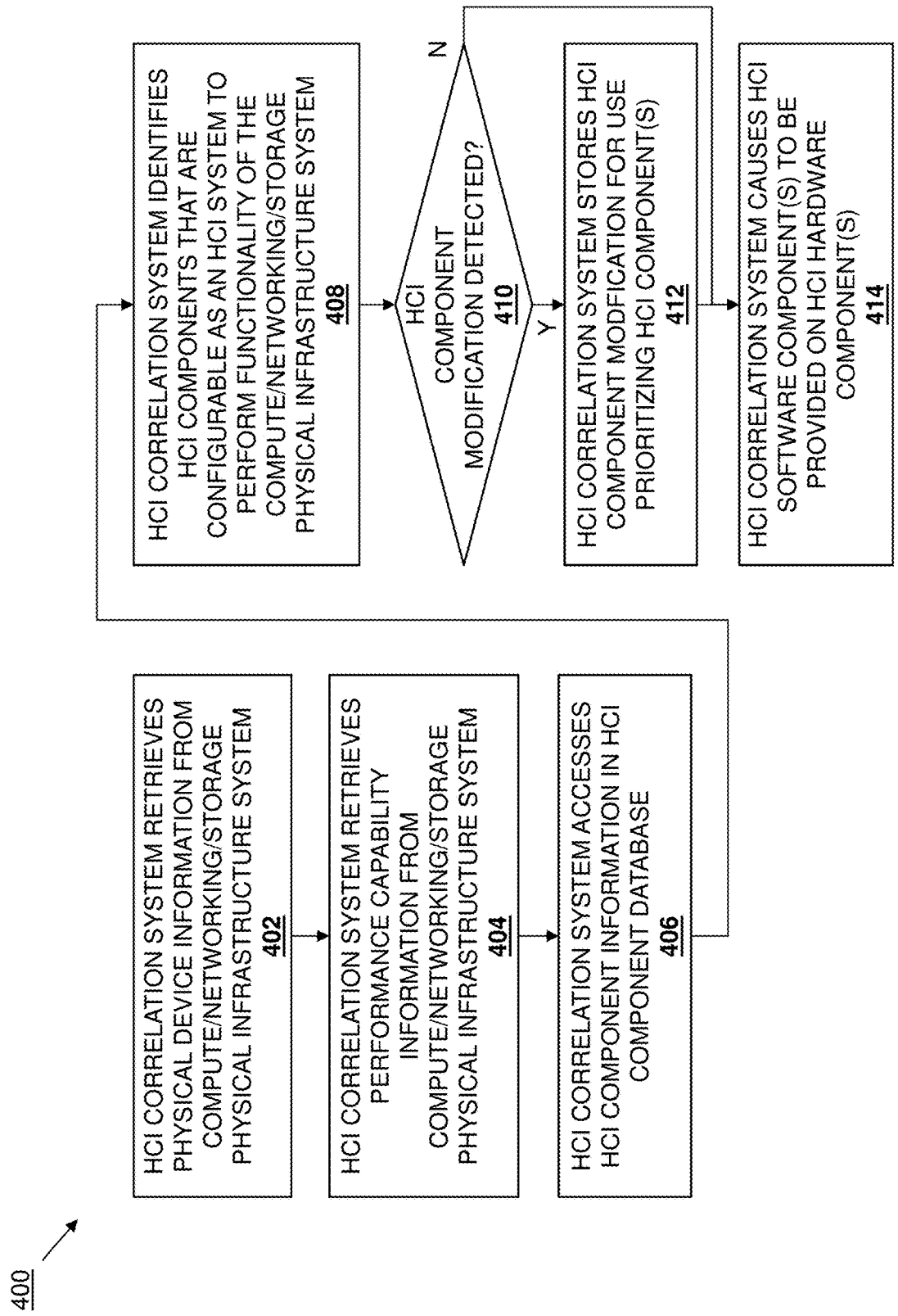
FIG. 4 is a flow chart illustrating an embodiment of a method for correlating an HCI system to a computer/networking/storage infrastructure.

Referring now to FIG. 4, an embodiment of a method 400 for correlating an HCI system to a computer/networking/storage infrastructure is illustrated. As discussed below, embodiments of the systems and methods of the present disclosure provide for the provisioning of HCI systems to replace traditional compute/networking/storage physical infrastructure systems. However, one of skill in the art will recognize that the systems and methods of the present disclosure may also provide for the provisioning of HCI systems to provide new functionality (e.g., for a new datacenter), HCI systems to expand existing functionality (e.g., in an existing datacenter), etc. In some embodiments, an HCI correlation system may operate to gather physical device information about a compute/networking/storage physical infrastructure system, as well as performance capability information about that compute/networking/storage physical infrastructure system. The HCI correlation system may then access an HCI component database that is fed information about HCI components that may include HCI component capabilities, HCI component applicabilities, HCI component positioning strategies, and/or any other HCI component information that would be apparent to one of skill in the art in possession of the present disclosure. The HCI correlation system then uses the physical device information and performance capability information about the compute/networking/storage physical infrastructure system in order to correlate the compute/networking/storage physical infrastructure to a plurality of HCI components for an HCI system that is capable of performing the functionality of the compute/networking/storage physical infrastructure system. The HCI correlation system may then size the HCI system/components in order to support migration of the compute/networking/storage physical infrastructure system to the HCI system, and cause at least one HCI software component included in the plurality of HCI components to be provided on at least one HCI hardware component included in the plurality of HCI components.

In addition, the HCI correlation system may track HCI component modifications made to the HCI components that are initially identified for the HCI system to make it capable of performing the functionality of the compute/networking/storage physical infrastructure system, and use those HCI component modifications to change the weighting/prioritization of HCI components that is used to select HCI components for an HCI system that can perform the functionality of any particular compute/networking/storage physical infrastructure system. As such, the determination of HCI systems for replacing compute/networking/storage physical infrastructure systems may be optimized by focusing on the specific physical devices and physical device performance capabilities that are being replaced, along with the consideration of HCI component capabilities and positioning strategies. Furthermore, as HCI systems including a variety of HCI components are identified for replacing compute/networking/storage physical infrastructure systems, modifications of those HCI systems prior to their implementation (via the selection of different HCI components) may be used to adjust prioritizations and/or weightings of HCI components that are used to identify HCI components, thus adjusting the identification of HCI components for future HCI systems. As such, a broad portfolio of HCI components may be offered for providing HCI systems to replace computer/networking/storage physical infrastructure systems, with the selection of subsets of those HCI components for any particular HCI system optimized based on the physical device and performance requirements of the existing compute/networking/storage physical infrastructure system, as well as on HCI component positioning requirements that may be set by an HCI system provider.

Figure 5A:
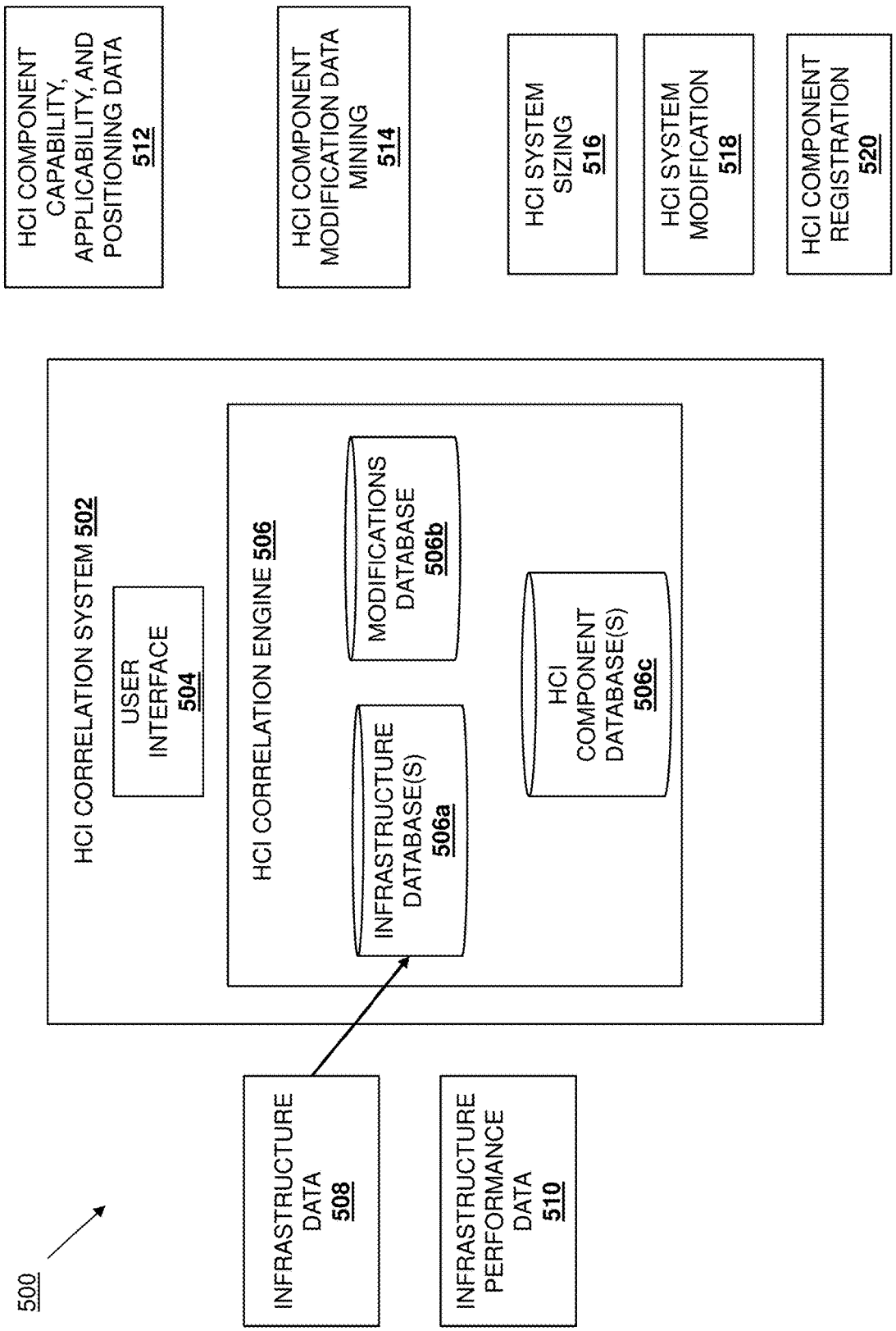
FIGS. 5A-5K provide a schematic view illustrating an embodiment of the operations of the HCI correlation system of FIG. 2 during the method of FIG. 4.

The method 400 may begin at block 402 where an HCI correlation system retrieves physical device information from a compute/networking/storage physical infrastructure system. In an embodiment, at block 402, the infrastructure information sub-engine 304b provided by the HCI correlation engine 304 in the HCI correlation system 206/300 may operate to retrieve physical device information from the compute/networking/storage physical infrastructure system 202a through the network 204 via its communication system 314. For example, the physical device information retrieved at block 402 may include physical device features and/or configurations of the compute/networking/storage physical infrastructure system 202a such as types of physical devices (e.g., All Flash (AF) series type devices available from VMWARE® of Palo Alto, Calif., United States; Hybrid (HY) series type devices available from VMWARE® of Palo Alto, Calif., United States, Non-Volatile Memory express (NVMe) type devices, etc.), resiliency levels of physical devices (e.g., those with mirroring capabilities, those with error correction capabilities, etc.), supported configurations of physical devices (e.g., disaggregated physical devices, converged infrastructure devices, etc.), a number of nodes in a cluster, and/or any other physical device information that would be apparent to one of skill in the art in possession of the present disclosure. In some examples, a user of the compute/networking/storage physical infrastructure system 202a may provide the physical device information via a web portal hosted by the HCI correlation system 206/300 (e.g., via a questionnaire available on that web portal), although automated physical device information retrieval by the HCI correlation system 206/300 (e.g., via the network 204) will fall within the scope of the present disclosure as well. FIG. 5A provides an operational flow 500 that illustrates infrastructure data 508 being provided in infrastructure database(s) 506a utilized by an HCI correlation engine 506 provided by an HCI correlation system 502.

The method 400 may then proceed to block 404 where the HCI correlation system retrieves performance capability information from the compute/networking/storage physical infrastructure system. In an embodiment, at block 404, the infrastructure performance sub-engine 304c provided by the HCI correlation engine 304 in the HCI correlation system 206/300 may operate to retrieve performance capability information from the compute/networking/storage physical infrastructure system 202a through the network 204 via its communication system 314. For example, the performance capability information retrieved at block 404 from the compute/networking/storage physical infrastructure system 202a may include throughput capabilities, latency capabilities, and/or other capabilities of relatively small, medium, and large configurations of different types of compute/networking/storage physical infrastructure systems (e.g., those including AF series type devices available from VMWARE® of Palo Alto, Calif., United States; HY series type devices available from VMWARE® of Palo Alto, Calif., United States, Non-Volatile Memory express (NVMe) type devices, etc.) In other examples, the performance capability information retrieved at block 404 from the compute/networking/storage physical infrastructure system 202a may include data describing workloads (e.g., general purpose virtualized workloads, Virtual Desktop Infrastructure (VDI) workloads, Structured Query Language (SQL)/ORACLE®/SAP® business application workloads, etc.) associated with the compute/networking/storage physical infrastructure systems.

Figure 5B:
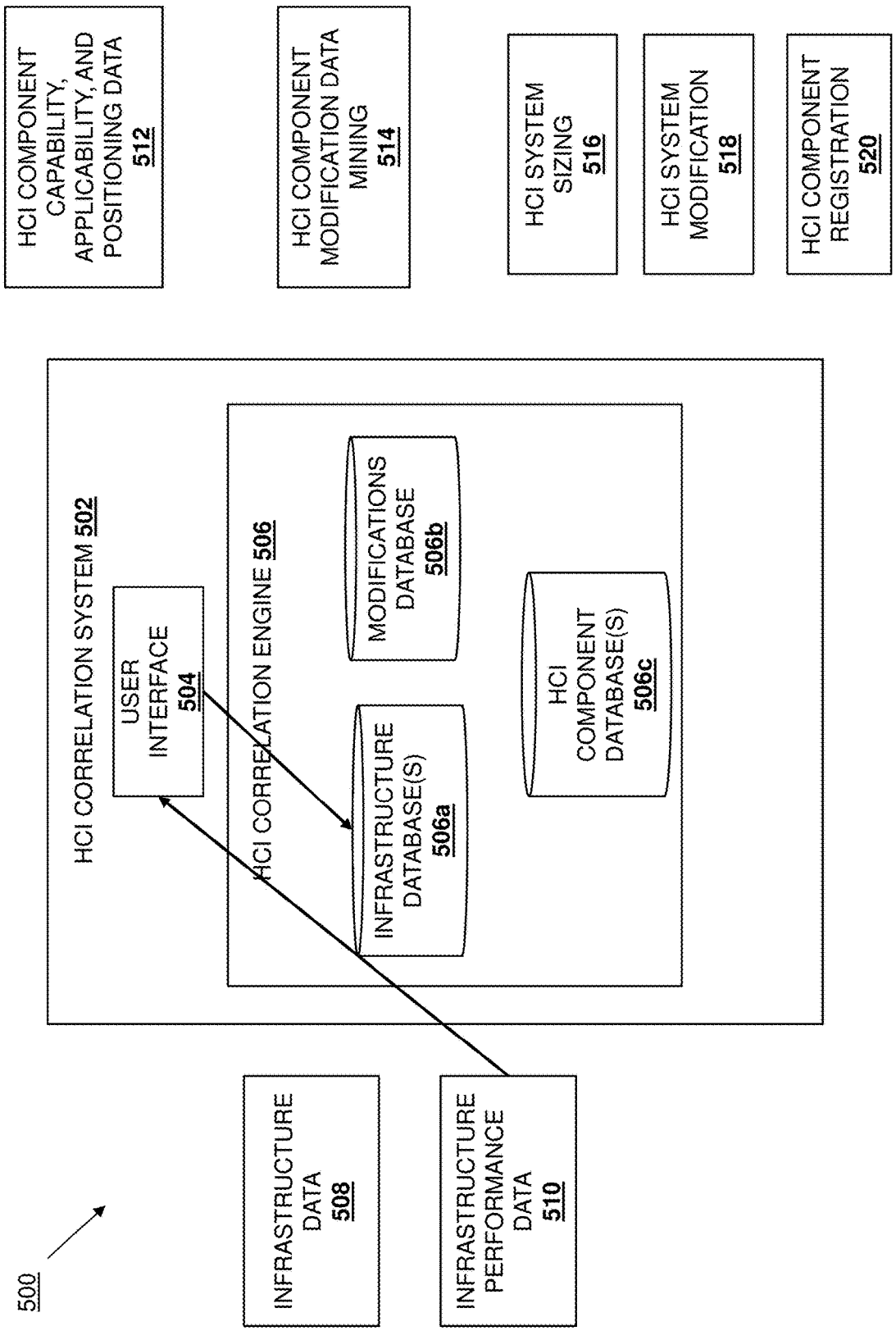

In yet other examples, the performance capability information retrieved at block 404 from the compute/networking/storage physical infrastructure system 202a may include use-cases (e.g., data center converged infrastructure use cases, disaggregated Software Defined Storage (SDS) use cases, Remote Office/Brand Office (ROBO) use cases, etc.) associated with the compute/networking/storage physical infrastructure systems. In yet other examples, the performance capability information retrieved at block 404 from the compute/networking/storage physical infrastructure system 202a may include service support models (e.g., single StockKeeping Unit (SKU) service support models, contextual service support models, disjointed service support models, vendor-led Life Cycle Management (LCM) service support models and/or Service Level Agreement (SLA) service support models, customer-driven LCM service support models, etc.) associated with the compute/networking/storage physical infrastructure systems. However, any other performance capability information that would be apparent to one of skill in the art in possession of the present disclosure may be retrieved at block 404 while remaining within the scope of the present disclosure. In specific examples, the infrastructure performance sub-engine 304c that retrieves the performance capability information at block 404 may be provided by a LIVEOPTICS® system available from DELL® Inc. of Round Rock, Tex., United States, although other sub-engines for retrieving performance capabilities information will fall within the scope of the present disclosure as well. FIG. 5B provides the operational flow 500 that illustrates infrastructure performance data 510 being collected via a user interface 504 provided by the HCI correlation system 502 and provided in the infrastructure database(s) 506a utilized by the HCI correlation engine 506 provided by the HCI correlation system 502.

The method 400 may then proceed to block 406 where the HCI correlation system accesses HCI component information in an HCI component database. While not explicitly illustrated in FIG. 3, some embodiments of the method 400 may include the HCI component information sub-engine 304d provided by the HCI correlation engine 304 in the HCI correlation system 300 receiving HCI component information about HCI components that are available to provide the HCI systems discussed below that can perform the functionality of the compute/network/storage physical infrastructure systems, and storing that HCI component information in the HCI component database 310. In some embodiments, HCI component information may include an information about the capabilities of HCI software and/or hardware components that would be apparent to one of skill in the art in possession of the present disclosure. Furthermore, HCI component information may also include HCI component positioning information such as data that maps HCI component positioning strategies for HCI components that may have overlapping capabilities and applicabilities for performing that functionality. For example, for SDS-based infrastructure systems, an existing infrastructure based on VMWARE® products (available from VMWARE® of Palo Alto, Calif., United States) may be mapped to virtual Storage Area Network (vSAN) Ready Nodes (vSRN) products, VxRail products, and/or VxRack products (provided according to the VMWARE® Cloud Foundation (VCF) or a Software Defined Data Center (SDDC)) available from DELL® Inc. of Round Rock, Tex., United States.

In another example, for SDS-based infrastructure systems, an existing infrastructure based on MICROSOFT® products (available from MICROSOFT® Corporation of Redmond, Wash., United States) may be mapped to Storage Spaces Direct Ready Nodes (S2DRN) products, WINDOWS® Server Software-Defined (RS-WSSD) products, or VxRack AS products available from DELL® Inc. of Round Rock, Tex., United States. In yet another example, for SDS-based infrastructure systems, an existing infrastructure based on mixed products may be mapped to VxFlex products, VxRack Flex products, and/or XC series products available from DELL® Inc. of Round Rock, Tex., United States. In yet another example, for SDS-based infrastructure systems, an existing infrastructure based on end-to-end MICROSOFT®-application-to-infrastructure-stack-via-SQL may be mapped to S2DRN products available from DELL® Inc. of Round Rock, Tex., United States.

Figure 5C:
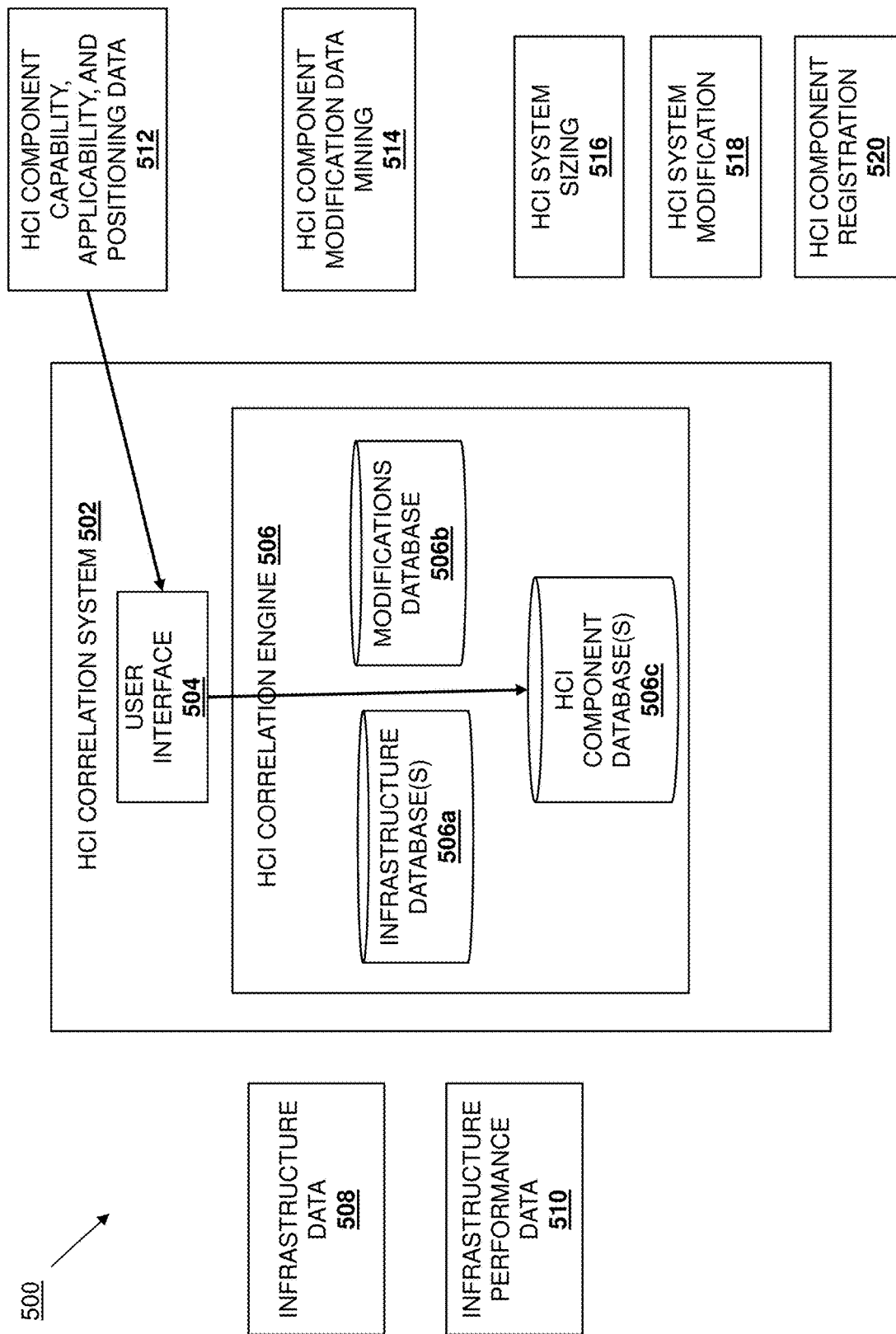

In yet another example, traditional external-storage-based infrastructure systems may be mapped to FlexOS-based or Storage Spaces Direct (S2D)-based disaggregated SDS infrastructure systems for ORACLE®-based and SAP®-based migration use cases. In different embodiments, HCI component positioning information may prioritize some HCI components over other HCI components (e.g., OpenStack cluster migration components over VxFlex or XC-based HCI components available from DELL® Inc. of Round Rock, Tex., United States.) Furthermore, the HCI component information stored in the HCI component information database 312 may be retrieved from a variety of data sources, captured from previous HCI system provisioning flows, and/or received via a variety of techniques that would be apparent to one of skill in the art in possession of the present disclosure. As such, in embodiments of block 406, the HCI sizer sub-engine 304a provided by the HCI correlation engine 304 in the HCI correlation system 206/300 may access the HCI component information stored in the HCI component database 310. FIG. 5C provides the operational flow 500 that illustrates HCI component capability, applicability, and positioning data 512 being collected via the user interface 504 provided by the HCI correlation system 502 and provided in HCI component database(s) 506c utilized by the HCI correlation engine 506 provided by the HCI correlation system 502.

The method 400 may then proceed to block 408 where the HCI correlation system identifies HCI components that are configurable as an HCI system to perform functionality of the compute/networking/storage infrastructure system. In an embodiment, at block 408, the HCI sizer sub-engine 304a provided by the HCI correlation engine 304 in the HCI correlation system 206/300 uses the physical device information retrieved at block 402 and the performance capability information retrieved at block 404 in order to identify HCI components that are described by the HCI component information in the HCI component database 310 and that are configurable as an HCI system that performs the functionality of the compute/networking/storage physical infrastructure system 202a. In a specific example, the identification of the HCI components at block 408 may be influenced by the following high level formula:

$$CSI = fn(ec_1 + iw_1) + (ec_2 + iw_2) + \ldots + (ec_n + iw_n)$$

Where CSI provides an index that influences the identification of HCI components, ec provides a measure of the performance capability of an HCI components, iw provides a weight or prioritization of HCI components, and m is the total of number of HCI components being identified. The sample algorithm flow discussed below may provide data for the CSI via the use of performance data, sizing data, capability data, and applicability data that may be collectively formulated to determine the values of ec, while the values of iw may be determined via the HCI component positioning strategies discussed herein that may include components quotas and prioritizations that apply multiples to the ec variables to identify HCI components for an HCI system.

As such, the use of the physical device information and performance capability information retrieved from the compute/networking/storage physical infrastructure system 202a with the HCI component information stored in the HCI component database 310 provides for the dynamic identification of HCI components based on a variety of factors, with weights/prioritizations applied to those factors and capable of dynamic adjustment as well (e.g., if a user of the compute/networking/storage physical infrastructure system 202a has preferences for SDS technology, HCI components providing SDS technology may be weighted/prioritized higher than non-SDS technology HCI components.) The sample algorithm flow below provides one example of how a variety of HCI components may be available, and one of skill in the art in possession of the present disclosure will recognize how each of these factors may be associated with a variety of weights/prioritizations in order to provide for the identification of a variety of HCI components at block 408:

---

Physical device infrastructure system requirements: sizing and performance
    sizing: cache vs. capacity ratio || rack space || power consumption
    performance: throughput || latency || performance per watt
HCI components: capability || applicability || positioning
    capability: type of devices || level of resiliency || supported configurations || number of
    nodes || support hypervisor || container support || throughput and latency
    configurations
    applicability: workloads || use-cases || service-support model
    positioning: HCI component type & Ground Theory Method (GTM)
        HCI component type
            if (hypervisor = ESXi)
                if (operational model = buy)
                      HCI component type = VxRail || VxRack ||VxBlock
                else
                      HCI component type = VSRN || PE+VSAN+NSX+VCF
                      SKU
            else if (hypervisor != ESXi)
                if (operational model = buy)
                      HCI component type = VxRack AS || VxRack || Flex XC
                else
                      HCI component type = S2DRN || PE+Flex OS
        GTM = Quota & corporate positioning
Mapped HCI component: physical device infrastructure system requirements & HCI components
HCI sizer generated HCI system: mapped HCl component * sizing and performance
requirements
HCI ordering tool: import generated HCI system into HCI system building tool
HCI system confirmation registration: import generated HCI system and order details with
physical device infrastructure system details to registration sites

---

The positioning portion of the algorithm above provides an example of the HCI component positioning utilized to identify HCI components for an HCI system as discussed below. For example, the algorithm provides that if an ESXi hypervisor is selected and the operational model is "buy", HCI components such as VxRail, VxRack, or VxBlock may be identified, while if the operational model is not "buy" (e.g., the operational model is "build"), HCI components such as VSRN or POWEREDGE® with VSAN, NSX, and VCT SKU are identified. Similarly, the algorithm provides that if a non-ESXi hypervisor is selected and the operational model is "buy", HCI components such as VxRack Azure Stack (AS), VxRack Flex, or XC are identified, while if the operational model is not "buy" (e.g., the operational model is "build"), HCI components such as S2DRN, or POWEREDGE® with FlexOS are identified. While a specific example of component positioning is provided above, one of skill in the art in possession of the present disclosure will recognize that component positioning details may vary based on a variety of factors while remaining within the scope of the present disclosure.

Figure 5D:
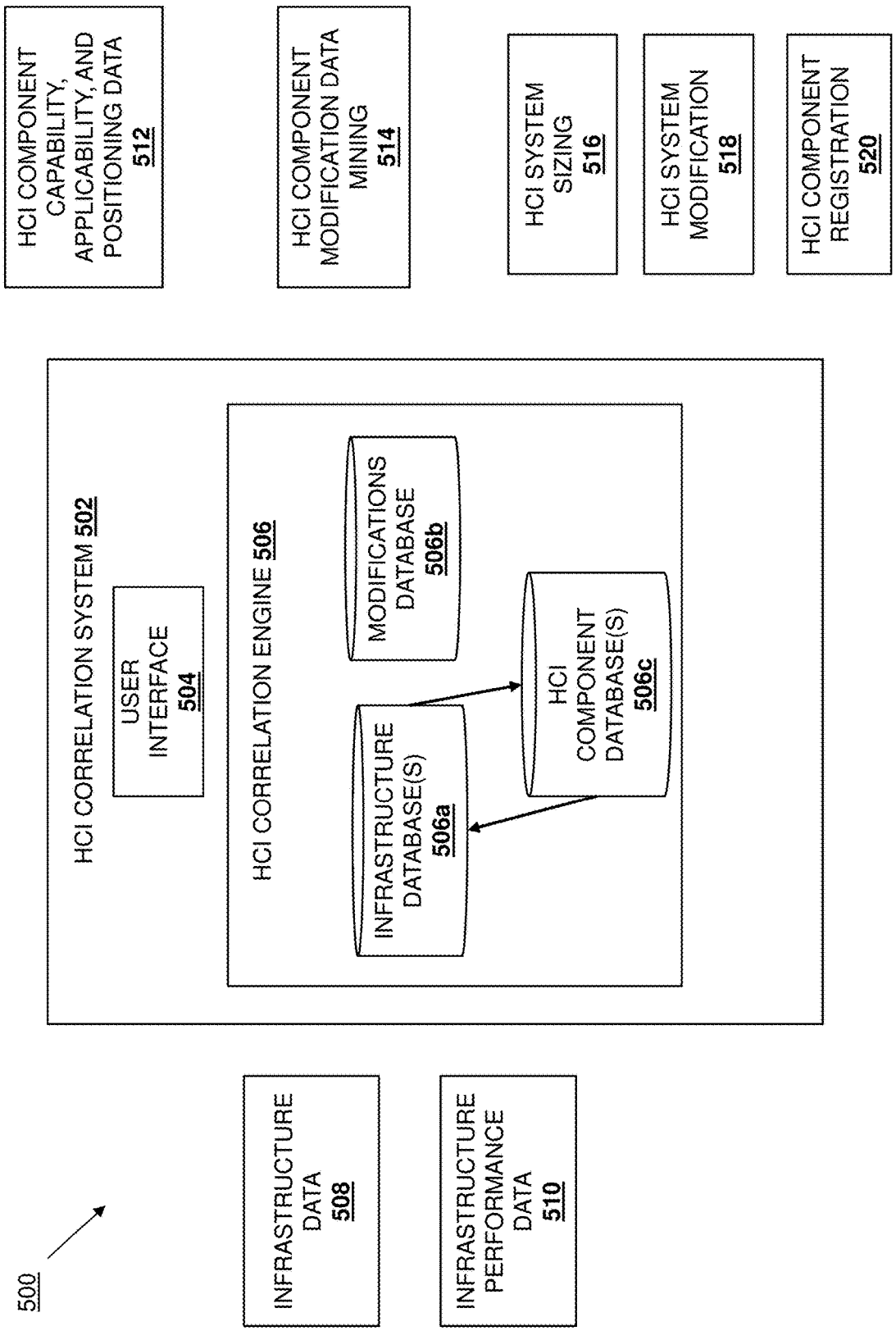
Figure 5E:
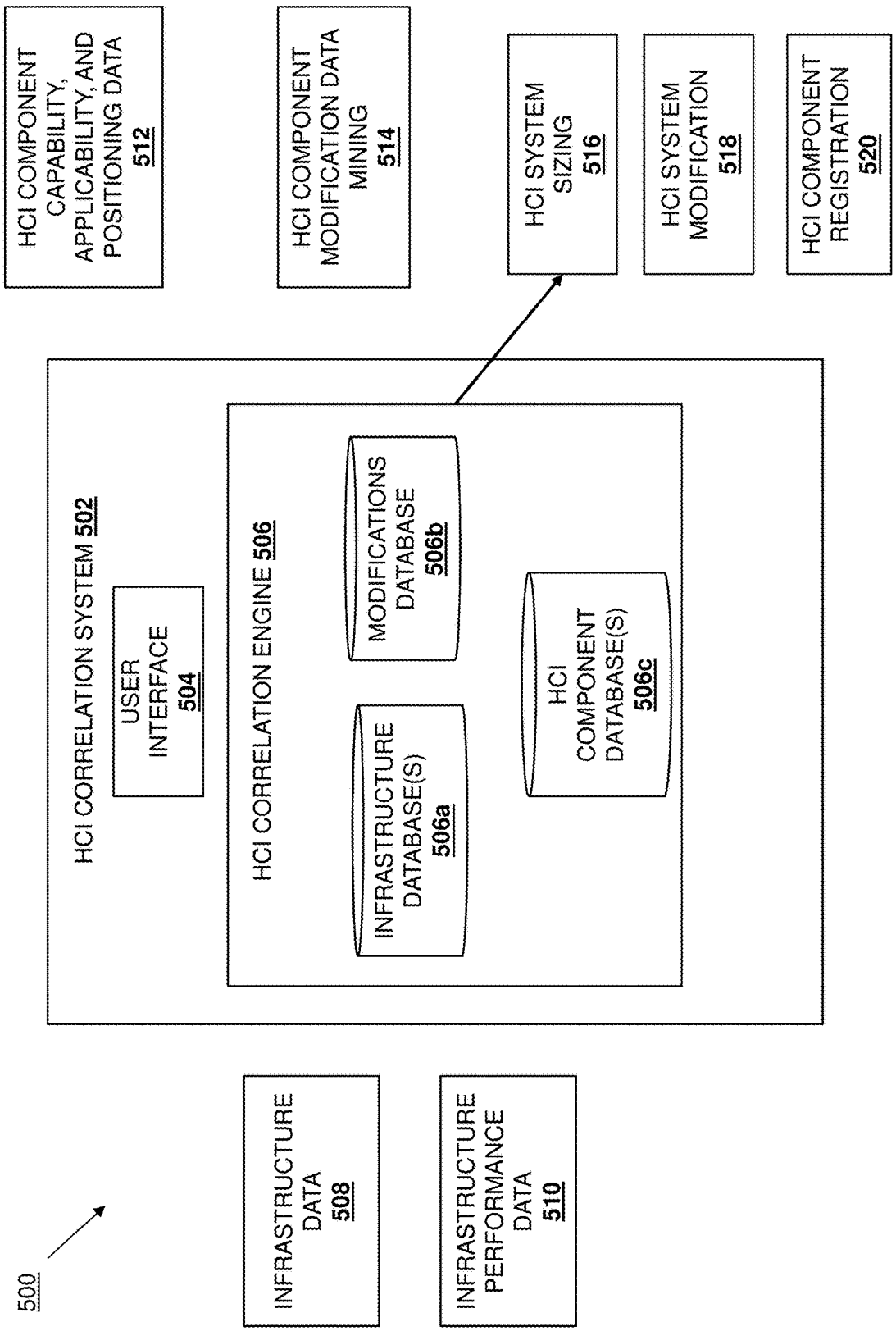

The use of formulas and algorithms like those provided in the examples above allow the HCI correlation engine 304 to utilize weightings and/or prioritizations for various parameters that drive the identification of HCI components to provide an HCI system that is capable of performing the functionality of the compute/networking/storage physical infrastructure system 202a, and that include HCI components that address the requirements of the compute/networking/storage physical infrastructure system 202a, while aligning with HCI component positioning strategies of an HCI component/HCI system provider. As such, the HCI sizer sub-engine 304a may apply formulas/algorithms that factor in the physical device information and performance capability information retrieved at blocks 402 and 404 along, with a variety of weighting/prioritization factors in order to identify a specific set of HCI components that will provide the HCI system that can perform the functionality of the compute/networking/storage physical infrastructure 202a. FIG. 5D provides the operational flow 500 that illustrates the HCI correlation engine 506 provided by the HCI correlation system 502 utilizing the data included in the infrastructure database(s) 506a and the HCI component database(s) 506c in order to identify the HCI components as discussed above. FIG. 5E provides the operational flow 500 that illustrates the HCI correlation engine 506 provided by the HCI correlation system 502 providing the identified HCI components for HCI system sizing 516.

The method 400 may then proceed to decision block 410 where the HCI correlation system determines whether an HCI component modification has been detected. In some embodiments, following the identification of HCI components at block 408, the HCI correlation engine 304 may provide the identified HCI components (e.g., as part of a recommended HCI system) for display on a display device (e.g., provided by a display device in the HCI system 206/300, provided by a display device in a computing system controlled by the user of the compute/networking/ storage physical infrastructure system 202a, etc.) In an embodiment, at decision block 410, a viewer of the identified HCI components may provide an HCI component modification that may, for example, replace one or more of the HCI components identified at block 408 with a different HCI component. For example, as discussed below, a user of the compute/networking/storage physical infrastructure system 202a may have preferences for HCI components other than those identified at block 408, and may request the HCI component modification to change any of the identified HCI components to a preferred HCI component, and the HCI correlation engine 304 will detect that HCI component modification at decision block 410.

If, at decision block 410, the HCI correlation system determines that an HCI component modification has been detected, the method 400 proceeds to block 412 where the HCI correlation engine 304 stores the HCI component modification for use in prioritizing HCI components. In some embodiments, an HCI component modification may be stored in order to identify "drifts" or other changes from the HCI components identified using the formulas and/or algorithms described above, and as HCI component modifications are detected over many performances of the method 400, that information may be analyzed to determine HCI component trends, adoption, and/or other information that may then be utilized to adjust the weighting and/or prioritization of HCI components identified using those formulas/ algorithms so that HCI component identifications may more closely follow those trends, that adoption, etc. As such, at block 412, the HCI correlation engine 304 may detect HCI component modifications provided during any performance of the method 400, store those HCI component modifications in the HCI component modification database 312, and then following any of those performances of the method 400, may analyze the HCI component modification information stored in the HCI component modification database 312. Based on that analysis, the HCI correlation engine 304 may then adjust the formulas and/or algorithms (e.g., the HCI component weightings included therein) utilized by the HCI correlation engine 304 in order to take into account the HCI component modifications by, for example, changing the weighting and/or prioritization of HCI components to reflect the selections of particular HCI components over originally identified HCI components via those HCI component modifications.

Figure 5F:
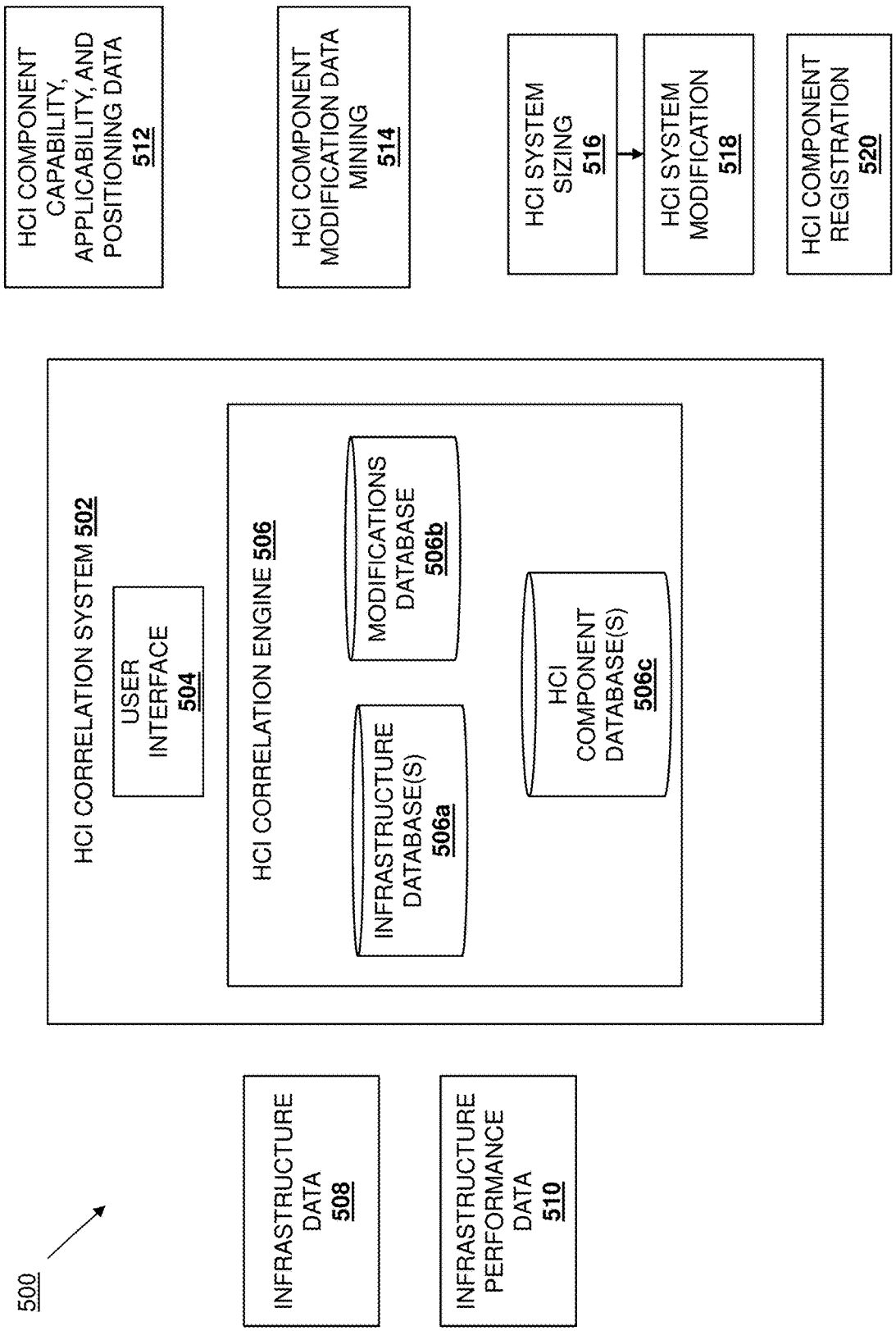
Figure 5G:
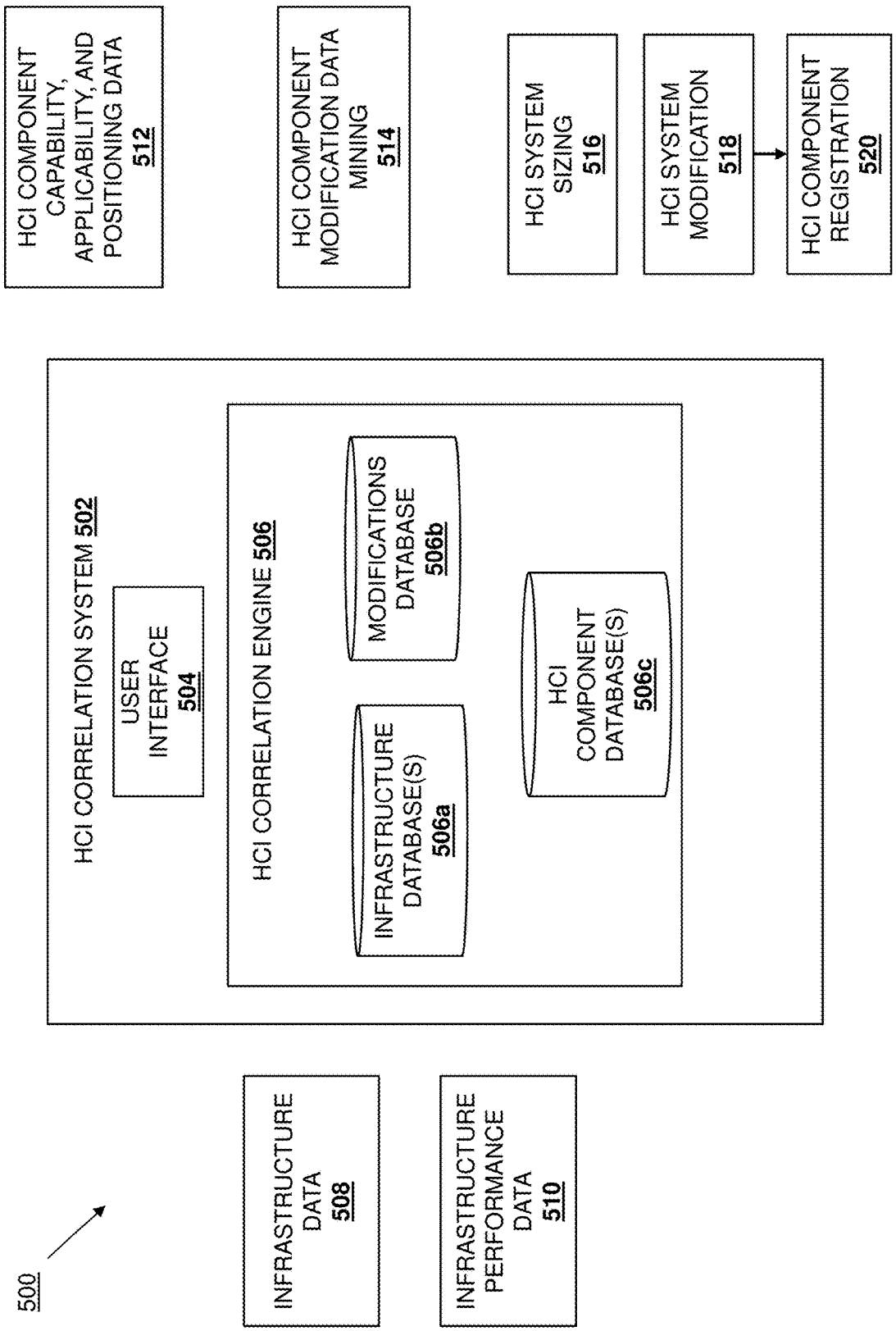
Figure 5H:
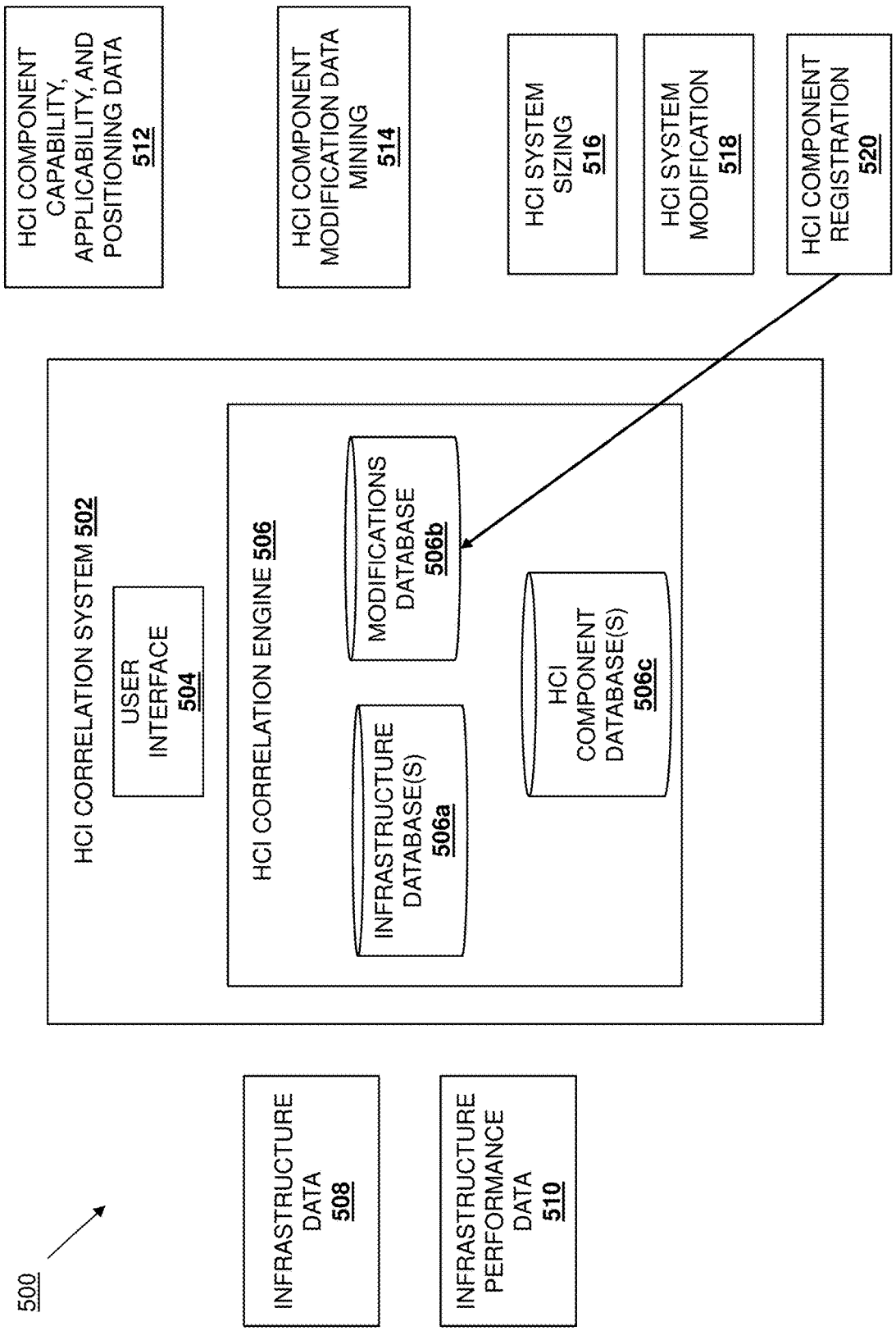
Figure 5I:
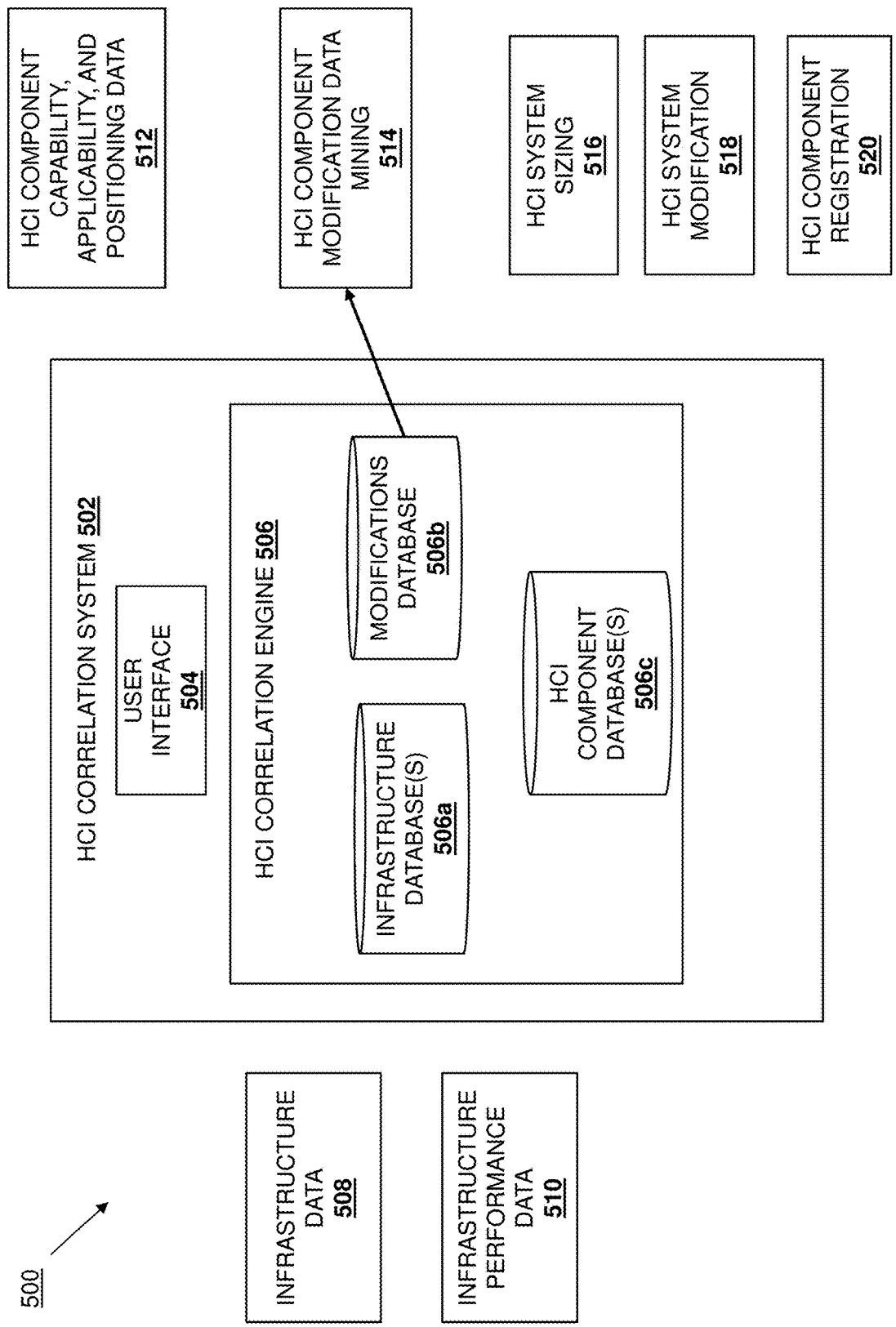
Figure 5J:
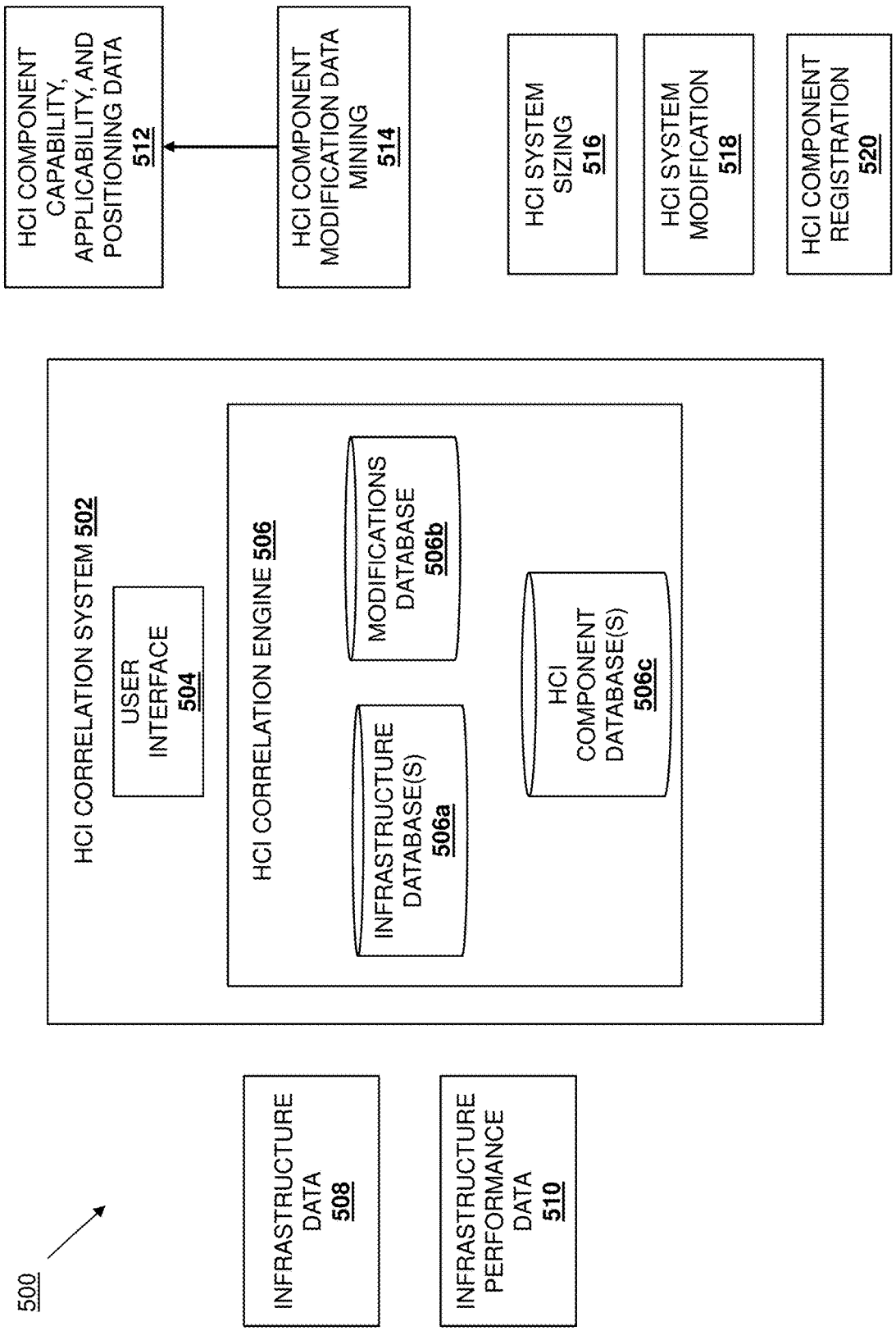
Figure 5K:
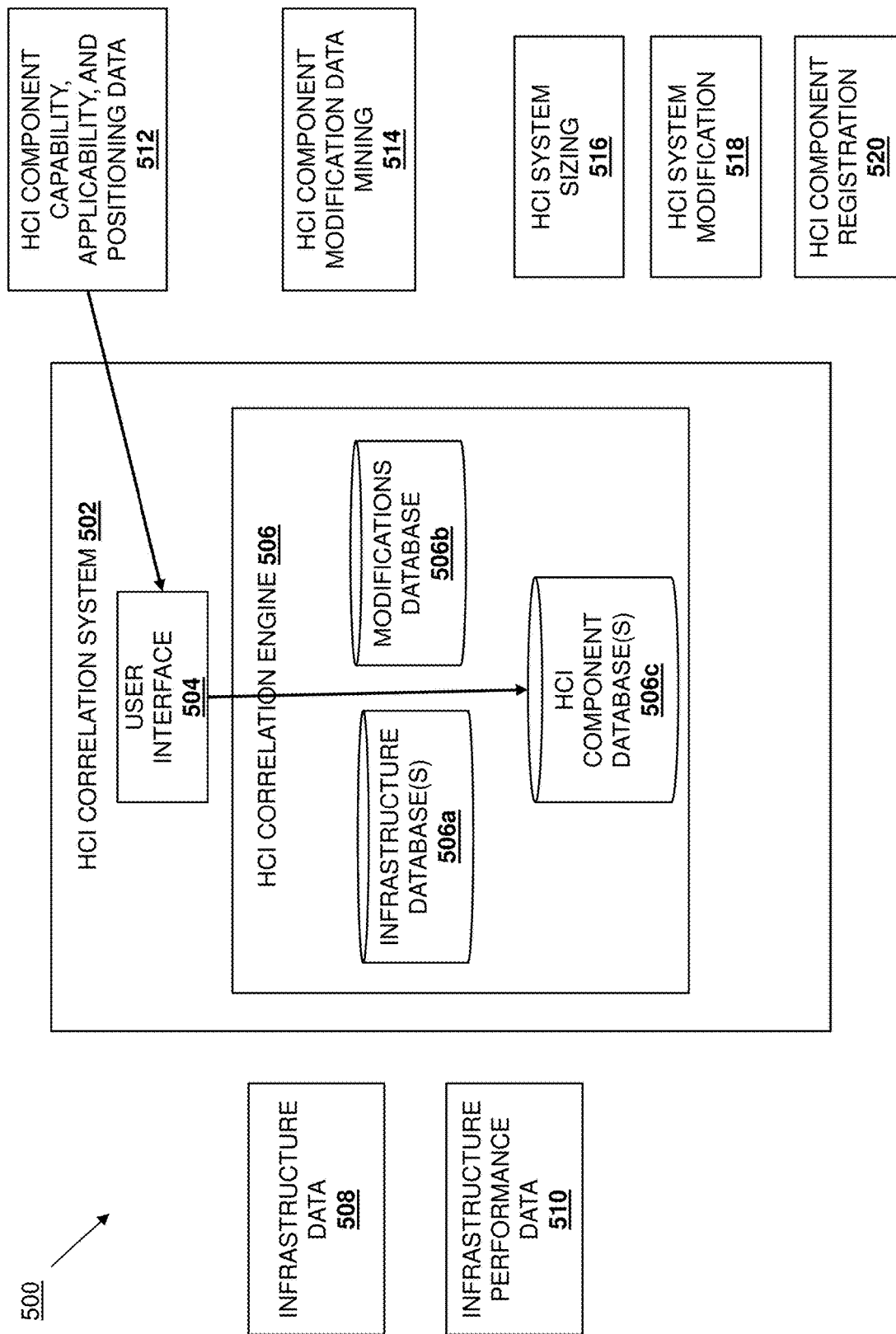

FIG. 5F provides the operational flow 500 that illustrates the sized and identified HCI components being subject to HCI component modification 518, while FIG. 5G provides the operational flow 500 that illustrates the registration 520 of HCI components after the HCI component modification 518. FIG. 5H provides the operational flow 500 that illustrates HCI component modification data being provided to a modifications database 506b utilized by the HCI correlation engine 506, and FIG. 5I provides the operational flow that illustrates the HCI component modification data being mined 514. FIG. 5J provides the operational flow 500 that illustrates the HCI component modification data mining 514 can provide its resulting data to the HCI component capability, applicability, and positioning data 512 (e.g., by changing the interface weighting as discussed above), and FIG. 5K provides the operational flow 500 that illustrates that HCI component capability, applicability, and positioning data 512 (e.g., with the modified interface weighting) being provided through the user interface 504 to the HCI component database(s) 506c in the HCI correlation engine 506 for use in subsequent identifications of HCI systems/components, If, at decision block 410, the HCI correlation system determines that no HCI component modification has been detected, or following block 412, the method 400 proceeds to block 412 where the HCI correlation system causes HCI software component(s) to be provided on HCI hardware component(s). In an embodiment, at block 412, the HCI correlation engine 304 may operate to cause at least one HCI software component (which was identified at block 408 or provided via an HCI component modification at decision block 410) to be provided on at least one HCI hardware component (which was identified at block 408 or provided via an HCI component modification at decision block 410.) As such, an HCI system may be created at block 412 by installing HCI software component(s) on HCI hardware components in order to provide the HCI system in a configuration that is capable of performing any of the functionality of the compute/networking/storage physical infrastructure 202a. In addition, any new functionality or increased/ expanded functionality (relative to that which the compute/ networking/storage physical infrastructure system 202a is capable of) may be specified for the HCI system as well, allowing for the identification of HCI software components and/or HCI hardware components that provide for a new level of functionality (e.g., for a new datacenter) or a higher/expanded level of functionality (e.g., for an existing datacenter) than that provided by the compute/networking/ storage physical infrastructure system 202a.

Thus, systems and methods have been described that provide for the identification of HCI components for an HCI system in order to provide an HCI system that is capable of performing the functionality of an existing compute/networking/storage physical infrastructure system. The systems and methods of the present disclosure provide the ability to determine the most suitable HCI components for providing such an HCI system via the dynamic mapping of performance metrics and compute/networking/storage physical infrastructure requirements with HCI component capabilities, applicabilities, and positioning. Furthermore, the adoption and selection trends of HCI components may be captured during the creation of such HCI systems via the analysis of HCI component modifications made to the HCI components identified via the systems and methods of the present disclosure, which allows for the HCI component identifications to be improved upon in light of those adoption and selection trends via changes in the weighting and prioritization of HCI components that influences the identification of HCI components for future HCI systems created according to the HCI component identification of the present disclosure. As such, the automatic creation of HCI systems to replace compute/networking/storage physical infrastructures is provided, while simplifying the creation of such HCI systems from a wide variety of available HCI components in order to provide properly sized HCI systems having appropriate costs, while enforcing HCI component positioning strategies generated by HCI component providers in order to implement desired HCI components in those HCI systems.

Figure 6:
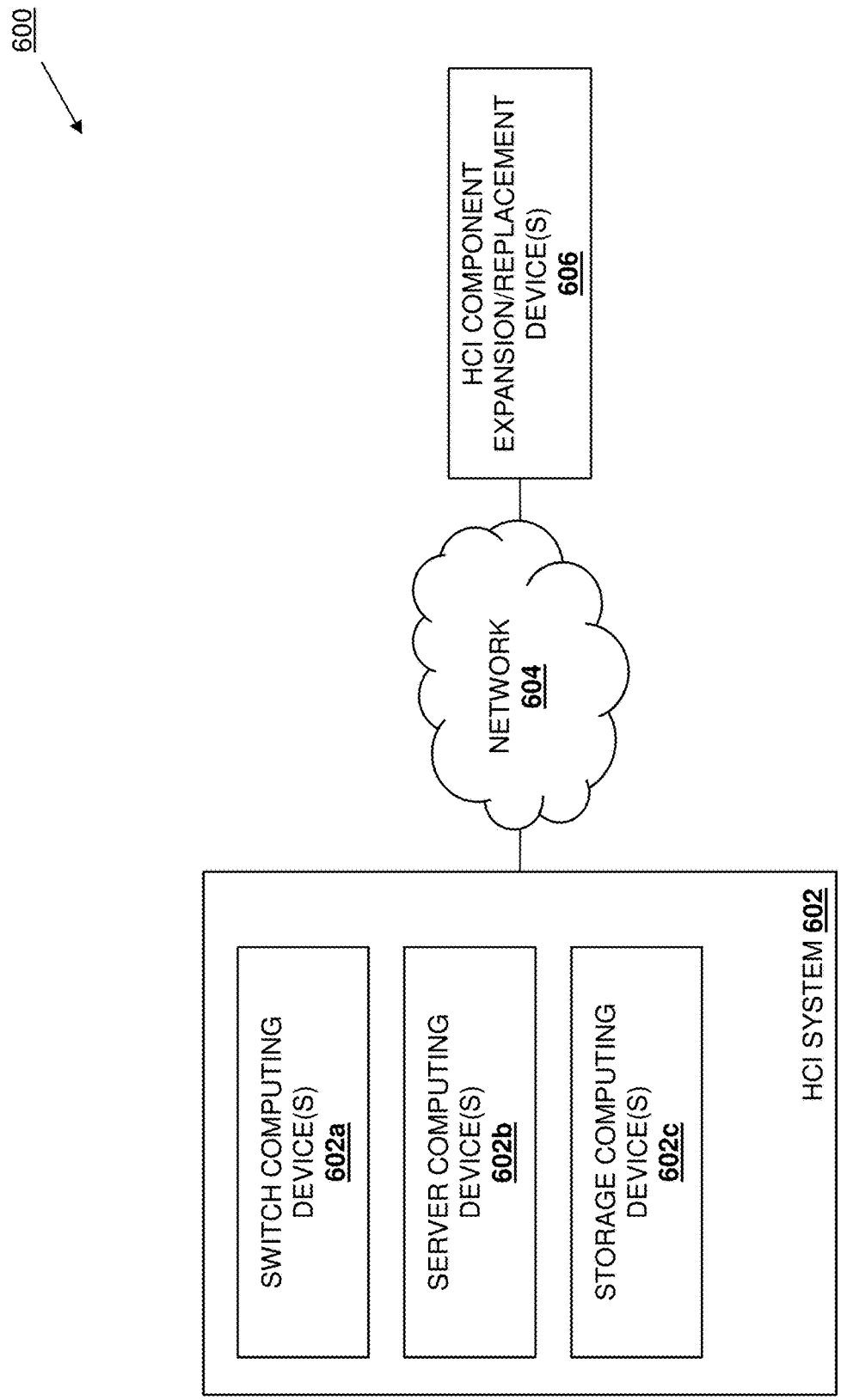
FIG. 6 is a schematic view illustrating an embodiment of a networked system including an HCI component expansion/replacement system coupled to an HCI system.

Referring now to FIG. 6, an embodiment of an networked system 600 is illustrated. In the illustrated embodiment, the networked system 600 includes an HCI system 202 that may be provided by one or more switch computing devices 602a, one or more server computing devices 602b, and one or more storage computing devices 602c. In an embodiment, any or all of the switch computing device(s) 602a, the server computing device(s) 602b, and the storage computing device(s) 602c may be provided by the IHS 100 discussed above with reference to FIG. 1, and/or may include some or all of the components of the IHS 100. However, while illustrated and discussed as including particular computing devices, one of skill in the art in possession of the present disclosure will recognize that HCI systems included in the HCI component expansion/replacement system 600 may include different devices and/or device configurations that will fall within the scope of the present disclosure as well. In some of the examples below, the HCI system 602 may be provided via the HCI correlation techniques described above with reference to the method 400 of FIG. 4, although HCI systems provided using other techniques will fall within the scope of the present disclosure as well.

In the illustrated embodiment, the HCI system 602 is coupled to a network 604 that may be provided by a Local Area Network (LAN), the Internet, combinations thereof, and/or any other network(s) that would be apparent to one of skill in the art in possession of the present disclosure. An HCI component expansion/replacement system 606 is coupled to the network 604 as well. In an embodiment, the HCI component expansion/replacement system 606 may be provided by the IHS 100 discussed above with reference to FIG. 1, and/or may include some or all of the components of the IHS 100, and in specific examples may include a plurality of server devices. However, while illustrated and discussed as being provided by a plurality of server devices, other devices and/or device configurations will fall within the scope of the present disclosure as well. In some specific examples, the HCI component expansion/replacement system 606 and the HCI correlation system 206 discussed above may be integrated and/or otherwise provided by the same system/device(s), although separate provisioning of the HCI correlation system 206 and HCI component expansion/replacement system 606 will fall within the scope of the present disclosure as well. Furthermore, while a specific networked system 600 has been illustrated and described, one of skill in the art in possession of the present disclosure will recognize that the HCI component expansion/replacement system of the present disclosure may include a variety of components and component configurations while remaining within the scope of the present disclosure as well.

Figure 7:
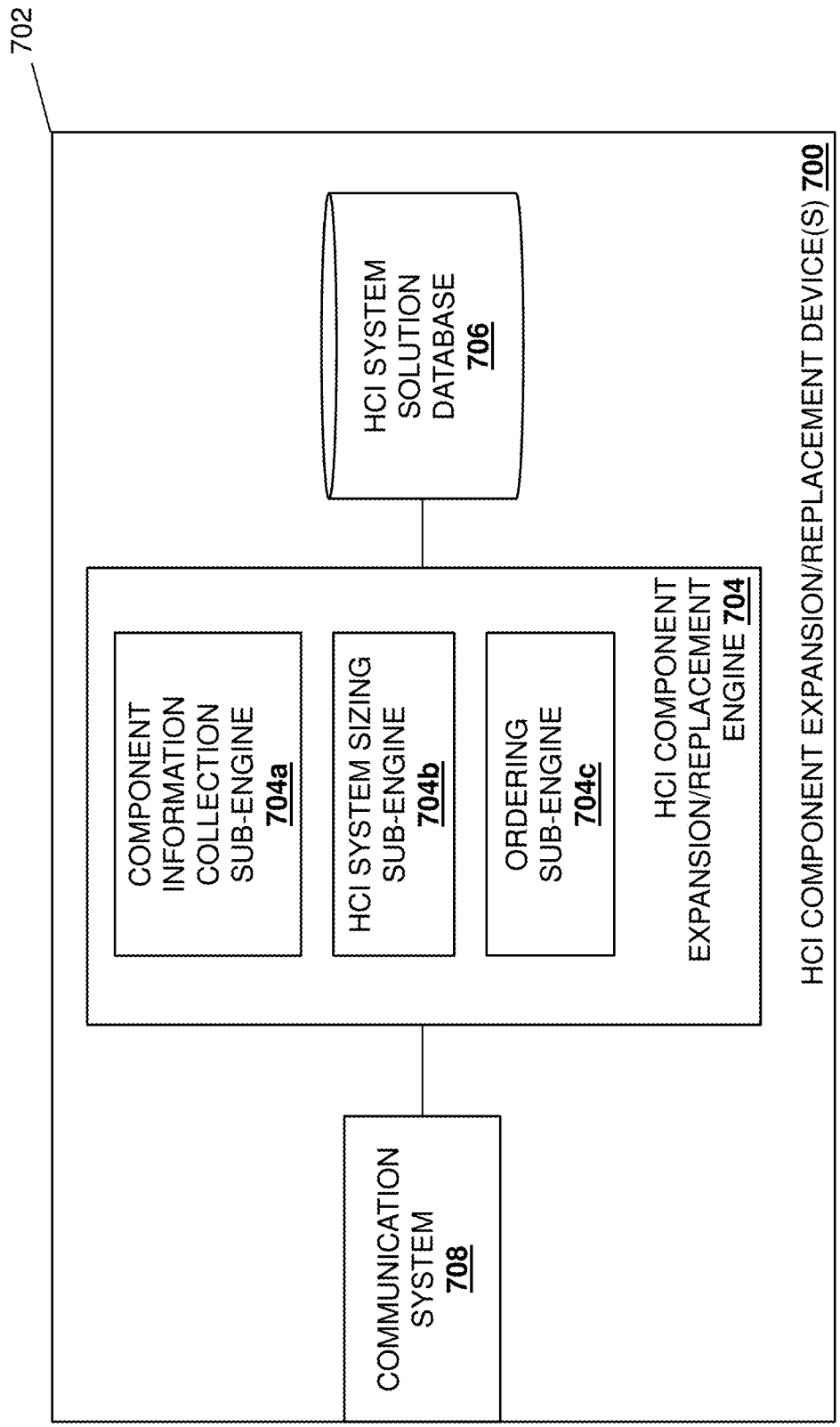
FIG. 7 is a schematic view illustrating an embodiment of an HCI component expansion/replacement system that may be included in the networked system of FIG. 6.

Referring now to FIG. 7, an embodiment of an HCI component expansion/replacement system 700 is illustrated that may provide the HCI component expansion/replacement system 606 discussed above with reference to FIG. 2. As such, the HCI component expansion/replacement system 700 may be provided by the IHS 100 discussed above with reference to FIG. 1 and/or may include some or all of the components of the IHS 100, and in specific examples may include one or more server devices. Furthermore, while illustrated and discussed as being provided by server device(s), one of skill in the art in possession of the present disclosure will recognize that the functionality of the HCI component expansion/replacement system 700 discussed below may be provided by other devices that are configured to operate similarly as the HCI component expansion/replacement system 700 discussed below. In the illustrated embodiment, the HCI component expansion/replacement system 700 includes one or more chassis 702 that house the components of the HCI component expansion/replacement system 700, only some of which are illustrated below. As such, one of skill in the art in possession of the present disclosure will appreciate that the components that provide the functionality of the HCI component expansion/replacement system 700 may be distributed across multiple chassis (e.g., as part of a "cloud-based" system) while remaining within the scope of the present disclosure.

For example, the chassis 702 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI component expansion/replacement engine 704 that is configured to perform the functionality of the HCI component expansion/replacement engines and/or HCI component expansion/replacement devices discussed below. In the specific embodiment illustrated in FIG. 7 and discussed in further detail below, the HCI component expansion/replacement engine 704 includes a component information collection sub-engine 704a that is configured to perform the functionality of the component information collection sub-engines and/or HCI component expansion/replacement devices discussed below, an HCI system sizing sub-engine 704b that is configured to perform the functionality of the HCI system sizing sub-engines and/or HCI component expansion/replacement devices discussed below, and an ordering sub-engine 704c that is configured to perform the functionality of the ordering sub-engines and/or HCI component expansion/replacement devices discussed below. However, while broken down into particular sub-engines in the specific example provided herein, one of skill in the art in possession of the present disclosure will appreciate that the functionality of the HCI component expansion/replacement engine 704 may be provided in a variety of manners that will fall within the scope of the present disclosure as well.

The chassis 702 may also house a storage system (not illustrated, but which may include the storage 108 discussed above with reference to FIG. 1) that is coupled to the HCI component expansion/replacement engine 704 (e.g., via a coupling between the storage system and the processing system) and that includes an HCI system solution database 706 that is configured to store any of the information utilized by the HCI component expansion/replacement engine 704 discussed below. The chassis 702 may also house a communication system 708 that is coupled to the HCI component expansion/replacement engine 704 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific HCI component expansion/replacement system 700 has been illustrated, one of skill in the art in possession of the present disclosure will recognize that HCI component expansion/replacement system (or other devices operating according to the teachings of the present disclosure in a manner similar to that described below for the HCI component expansion/replacement system 700) may include a variety of components and/or component configurations for providing conventional functionality, as well as the functionality discussed below, while remaining within the scope of the present disclosure as well.

Figure 8:
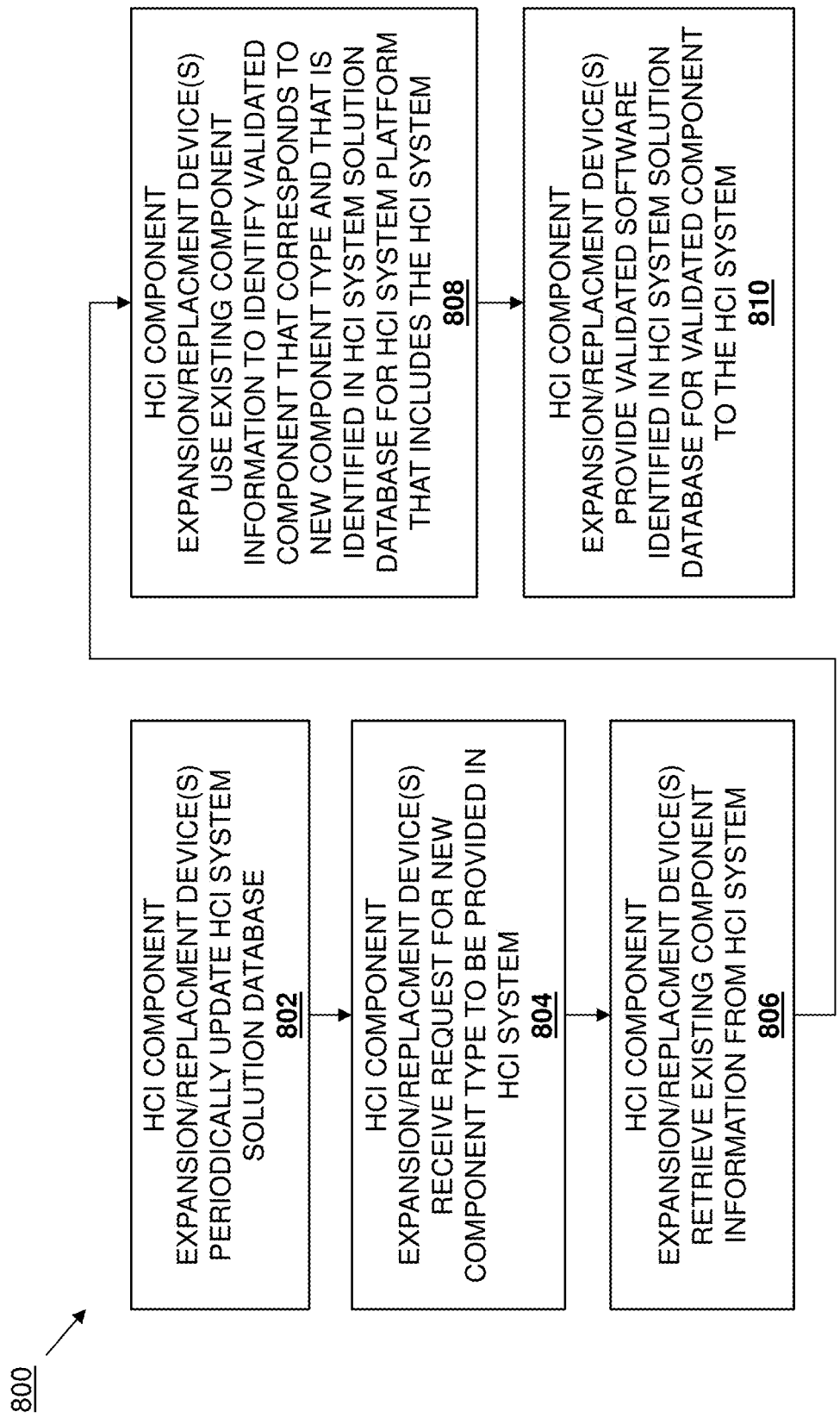
FIG. 8 is a flow illustrating an embodiment of a method for expanding/replacing components in an HCI system.

Referring now to FIG. 8, an embodiment of a method 800 for expanding/replacing components in an HCI system is illustrated. As discussed below, the systems and methods of the present disclosure provide for the consideration of current component configuration in an HCI system, along with components that have been validated to operate with an HCI system platform that includes that HCI system, when components are expanded or replaced in that HCI system. For example, the HCI component expansion/replacement system of the present disclosure may include HCI component expansion/replacement device(s) that periodically update an HCI system solution database to identify a plurality of validated components for an HCI system platform, and to identify validated software for each of the plurality of validated components. When the HCI component expansion/replacement system receives a request for a new component type to be provided in an HCI system, existing component information about a plurality of existing components that are included in the HCI system is retrieved and used to identify a first validated component that is identified in the HCI system solution database for the HCI system platform that includes that HCI system. The HCI component expansion/replacement system then provides the first validated software that is identified in the HCI system solution database for the first validated component to the HCI system. As such, the expansion or replacement of components in an HCI system may be automated in a manner that ensures that those components provide for optimal operation of that HCI system.

The method 800 begins at block 802 where HCI component expansion/replacement system periodically updates an HCI system solution database. In an embodiment, at block 802, the HCI component expansion/replacement engine 704 in the HCI component expansion/replacement system 606/700 may operate to periodically update the HCI system solution database 706. As will be appreciated by one of skill in the art in possession of the present disclosure, any particular HCI system "solution" may be include one or more HCI system platforms that each support a fixed number of components or component configurations as part of a solution infrastructure that may be designed, developed, and sustained by an HCI system solution engineering team (which may control or have access to the HCI component expansion/replacement system 606/700), and any information associated with the configurations providing an HCI system solution may be considered a "solution definition". Furthermore, as new versions of an HCI system solution are created (e.g., via HCI system platforms or components being removed from that HCI system solution, HCI system platforms or components being added to that HCI system solution, etc.), associated information stored in the HCI system solution database 706 for those new HCI system solution versions provides a "solution lifecycle" of the HCI system solution in the HCI system solution database 706. As such, in some embodiments, the HCI system solution database 706 may be considered an "HCI solution definition and lifecycle database" that may store versions of information about different HCI system solutions.

A specific example of initial component HCI system solution information that may be included in the HCI system solution database 706 is provided below:

```
{
    "solutionDescription" : "Microsoft Azure Stack HCI",
    "version" : "1.0.0.0",
    "supportedPlatforms" : [
        {
            "Name" : "R740xd Storage Spaces Direct RN",
            "id" : "R740xdS2DRN"
        },
        {
            "Name" : "R740xd2 Storage Spaces Direct RN",
            "id" : "R740xd2S2DRN"
        },
        {
            "Name" : "R640 Storage Spaces Direct RN",
            "id" : "R640S2DRN"
        },
        {
            "Name" : "R440 Storage Spaces Direct RN",
            "id" : "R440S2DRN"
        }
    ],
    "components" : [
        {
            "Name" : "Intel SSDSC2KG960G8R",
            "supportedPlatfoms" : [
                "R740xdS2DRN",
                "R740xd2S2DRN"
                "R640S2DRN"
                "R440S2DRN"
            ]
        },
        {
            "Name" : "TOSHIBA MG04ACA400NY",
            "supportedPlatfoms" : [
                "R740xdS2DRN",
                "R740xd2S2DRN"
            ]
        },
        {
            "Name" : "Hitachi HUH721008ALE600",
            "supportedPlatfoms" : [
                "R740xdS2DRN",
                "R740xd2S2DRN"
                "R640S2DRN"
                "R440S2DRN"
            ]
        },
    ]
}
```

As will be appreciated by one of skill in the art in possession of the present disclosure, the specific example of initial component HCI system solution information above describes an HCI system solution utilizing the MICROSOFT® Azure Stack HCI available from MICROSOFT® corporation of Redmond, Wash., United States, and one of skill in the art in possession of the present disclosure will appreciated that other HCI system solutions will fall within the scope of the present disclosure as well. Furthermore, the initial component HCI system solution information in the example above is a first version (e.g., "version": "1.0.0.0"), identifies a plurality of HCI system platforms included in the HCI system solution (e.g., "R740xd Storage Spaces Direct RN", "R740xd2 Storage Spaces Direct RN", "R640 Storage Spaces Direct RN", and "R440 Storage Spaces Direct RN"), and identifies storage components (e.g., "Intel SSDSC2KG960G8R", "TOSHIBA MG04ACA400NY", "Hitachi HUH721008ALE600") and the HCI system platforms those storage components have been validated for (e.g., "Intel SSDSC2KG960G8R" is validated for "R740xd Storage Spaces Direct RN", "R740xd2 Storage Spaces Direct RN", "R640 Storage Spaces Direct RN", and "R440 Storage Spaces Direct RN"; "TOSHIBA MG04ACA400NY" is validated for "R740xd Storage Spaces Direct RN" and "R740xd2 Storage Spaces Direct RN"; and "Hitachi HUH721008ALE600" is validated for "R740xd Storage Spaces Direct RN", "R740xd2 Storage Spaces Direct RN", "R640 Storage Spaces Direct RN", and "R440 Storage Spaces Direct RN"). However, while only storage components for particular HCI system platforms are described in the simplified example above, one of skill in the art in possession of the present disclosure will appreciate that other HCI system platforms may include a variety of different components (e.g., network components, processing components, memory components, etc.) that may be identified as part of an HCI system solution while remaining within the scope of the present disclosure as well.

In this specific example, the initial component HCI system solution information in the example above may be generated and provided in the HCI system solution database 706 when the HCI system solution is initially created. Subsequently, at block 802, the initial component HCI system solution information in the example above may be updated by (or via) the HCI component expansion/replacement engine 704 in the HCI component expansion/replacement system 606/700 to provide the specific example of the first updated component HCI system solution information below:

```
{
    "solutionDescription" : "Microsoft Azure Stack HCI",
    "version" : "1.0.1.0",
    "supportedPlatforms" : [
        {
            "Name" : "R740xd Storage Spaces Direct RN",
            "id" : "R740xdS2DRN"
        },
        {
            "Name" : "R740xd2 Storage Spaces Direct RN",
            "id" : "R740xd2S2DRN"
        },
        {
            "Name" : "R640 Storage Spaces Direct RN",
            "id" : "R640S2DRN"
        },
        {
            "Name" : "R440 Storage Spaces Direct RN",
            "id" : "R440S2DRN"
        }
    ],
    "components" : [
        {
            "Name" : "Intel SSDSC2KG960G8R",
            "supportedPlatforms" : [
                "R740xdS2DRN",
```

-continued

```
                "R740xd2S2DRN",
                "R640S2DRN",
                "R440S2DRN"
            ]
        },
        {
            "Name" : "TOSHIBA MG04ACA400NY",
            "supportedPlatforms" : [
                "R740xdS2DRN",
                "R740xd2S2DRN"
            ]
        },
        {
            "Name" : "Hitachi HUH721008ALE600",
            "supportedPlatforms" : [
                "R740xdS2DRN",
                "R740xd2S2DRN",
                "R440S2DRN"
            ]
        },
        {
            "Name" : "Seagate ST4000NM0265-2DC107",
            "supportedPlatforms" : [
                "R640S2DRN"
            ]
        },
    ]
}
```

As will be appreciated by one of skill in the art in possession of the present disclosure, the specific example of first updated component HCI system solution information above provides a second version of HCI system solution information (e.g., "version": "1.0.1.0") and removes an HCI system platform from supporting one of the storage components (e.g., "R640 Storage Spaces Direct RN" has been removed (i.e., no longer supports) "Hitachi HUH721008ALE600"), while adding a storage component (e.g., "Seagate ST4000NM0265-2DC107") that has been validated for one of the supported HCI system platforms (e.g., "Seagate ST4000NM0265-2DC107" is validated for "R640 Storage Spaces Direct RN").

In this specific example, on a subsequent iteration of block 802, the first updated component HCI system solution information in the examples above may again be updated by the HCI component expansion/replacement engine 704 in the HCI component expansion/replacement device(s) 606/700 to provide the specific example of the second updated component HCI system solution information below:

```
{
    "solutionDescription" : "Microsoft Azure Stack HCI",
    "version" : "1.2.0.0",
    "supportedPlatforms" : [
        {
            "Name" : "R740xd Storage Spaces Direct RN",
            "id" : "R740xdS2DRN"
        },
        {
            "Name" : "R740xd2 Storage Spaces Direct RN",
            "id" : "R740xd2S2DRN"
        },
        {
            "Name" : "R640 Storage Spaces Direct RN",
            "id" : "R640S2DRN"
        },
        {
            "Name" : "R440 Storage Spaces Direct RN",
            "id" : "R440S2DRN"
        },
        {
            "Name" : "R6515 Storage Spaces Direct RN",
```

```
            "id" : "R6515S2DRN"
        }
    ],
    "components" : [
        {
            "Name" : "Intel SSDSC2KG960G8R",
            "supportedPlatforms" : [
                "R740xdS2DRN",
                "R740xd2S2DRN",
                "R640S2DRN",
                "R440S2DRN",
                "R6515S2DRN"
            ]
        },
        {
            "Name" : "TOSHIBA MG04ACA400NY",
            "supportedPlatforms" : [
                "R740xdS2DRN",
                "R740xd2S2DRN",
                "R6515S2DRN"
            ]
        },
        {
            "Name" : "Seagate ST4000NM0265-2DC107",
            "supportedPlatforms" : [
                "R740xdS2DRN",
                "R740xd2S2DRN",
                "R640S2DRN",
                "R440S2DRN",
                "R6515S2DRN"
            ]
        },
    ]
}
```

As will be appreciated by one of skill in the art in possession of the present disclosure, the specific example of the second updated component HCI system solution information above provides a third version of HCI system solution information (e.g., "version": "1.2.0.0") and adds an HCI system platform to the HCI system solution (e.g., "R6515 Storage Spaces Direct RN"), identifies storage components supported by that HCI system platform (e.g., the "R6515 Storage Spaces Direct RN" has been added (i.e., supports) "Intel SSDSC2KG960G8R", "TOSHIBA MG04ACA400NY", and "Seagate ST4000NM0265-2DC107"), while removing a storage component (e.g., "Hitachi HUH721008ALE600") from the HCI system solution.

Furthermore, in addition to the HCI system platform and component information discussed above, the HCI system solution database 706 may be periodically updated at block 802 with software information for HCI solutions as well. A specific example of software HCI system solution information that may be included in the HCI system solution database 706 is provided below:

```
{
    "associatedSolution" : "Microsoft Azure Stack HCI",
    "sldcVersions" : [
        {
            "version" : "1.0.0.0",
            "platforms" : [
                {
                    "id" : "R740xdS2DRN",
                    "bios" : "2.3.0",
                    "cpId" : "1.0.1",
                    "idrac" : "3.36.36.36"
                },
                {
                    "id" : "R440S2DRN",
                    "bios" : "3.4.0",
                    "cpId" : "1.1.0",
                    "idrac" : "3.36.36.36"
                }
            ],
            "platformComponents" : [
                {
                    "id" : "Intel SSDSC2KG960G8R",
                    "firmware" : "10.18.0.19",
                    "driver" : "3.56.10",
                },
                {
                    "id" : "Seagate ST4000NM0265-2DC107",
                    "firmware" : "19.1.1.2",
                    "driver" : "10.8.1.2",
                }
            ]
        },
        {
            "version" : "1.2.0.0",
            "platforms" : [
                {
                    "id" : "R740xdS2DRN",
                    "bios" : "2.6.0",
                    "cpId" : "1.1.0",
                    "idrac" : "4.0.0.0"
                },
                {
                    "id" : "R440S2DRN",
                    "bios" : "3.5.0",
                    "cpId" : "1.2.0",
                    "idrac" : "4.0.0.0"
                }
            ],
            "platformComponents" : [
                {
                    "id" : "Intel SSDSC2KG960G8R",
                    "firmware" : "10.20.0.19",
                    "driver" : "3.60.0",
                },
                {
                    "id" : "Seagate ST4000NM0265-2DC107",
                    "firmware" : "20.0.0.0",
                    "driver" : "10.19.0.0",
                }
            ]
        }
    ]
}
```

As will be appreciated by one of skill in the art in possession of the present disclosure, the specific example of software HCI system solution information above describes software for an HCI system solution utilizing the MICROSOFT® Azure Stack HCI available from MICROSOFT® corporation of Redmond, Wash., United States, and one of skill in the art in possession of the present disclosure will appreciated that other HCI system solutions will fall within the scope of the present disclosure as well. Furthermore, the software HCI system solution information in the example above includes a first version (e.g., "version": "1.0.0.0") that identifies a plurality of HCI system platforms included in the HCI system solution (e.g., "R740xd Storage Spaces Direct RN" and "R440 Storage Spaces Direct RN") and validated software for each of those HCI system platforms (e.g., validated software for the "R740xd Storage Spaces Direct RN" includes software version "2.3.0" for the "bios", software version "1.0.1" for the "cpld", and software version "3.3.6.36.36" for the "idrac"; and validated software for the "R440 Storage Spaces Direct RN" includes software version "3.4.1" for the "bios", software version "1.1.0" for the "cpld", and software version "3.3.6.36.36" for the "idrac"), as well as plurality of storage components for those HCI system platforms (e.g., "Intel SSDSC2KG960G8R" and "Seagate ST4000NM0265-2DC107") and validated software for each of those storage components (e.g., validated software for the "Intel SSDSC2KG960G8R" includes software version "10.18.0.19" for the "firmware", and software version "3.56.10" for the "driver"; and validated software for the "Seagate ST4000NM0265-2DC107" includes software version "19.1.1.2" for the "firmware", and software version "10.8.1.2" for the "driver").

Further still, the software HCI system solution information in the example above includes a second version (e.g., "version": "1.2.0.0") that, for example, may be provided during the periodic updates at block 802, and that updates the validated software for each of the HCI system platforms (e.g., validated software for the "R740xd Storage Spaces Direct RN" has been updated to include software version "2.6.0" for the "bios", software version "1.1.0" for the "cpld", and software version "4.0.0.0" for the "idrac"; and validated software for the "R440 Storage Spaces Direct RN" has been updated to include software version "3.5.0" for the "bios", software version "1.2.0" for the "cpld", and software version "4.0.0.0" for the "idrac"), as well as updates the validated software for each of the storage components (e.g., validated software for the "Intel SSDSC2KG960G8R" has been updated to software version "10.20.0.19" for the "firmware", and software version "3.60.0" for the "driver"; and validated software for the "Seagate ST4000NM0265-2DC107" has been updated to include software version "20.0.0.0" for the "firmware", and software version "10.19.0.0" for the "driver"). However, while several specific examples of HCI system solution information are provided below, one of skill in the art in possession of the present disclosure will recognize that any of a variety of HCI system solution information may be updated at block 802 while remaining within the scope of the present disclosure.

As discussed in further detail below, the periodic updating of the HCI system solution database 706 allows for the determination of new components to expand an HCI system or replace existing components in an HCI system in a manner that ensures the selection of the most up-to-date validated components that are compatible with that HCI system. As will be appreciated by one of skill in the art in possession of the present disclosure, HCI system solution information like that described above allows such new components to be selected for any HCI system from the latest version of components that have been validated for the HCI system platform to which that HCI system belongs, and allows that HCI system to be provided with the latest version of software that has been validated for that HCI system and those components as well.

Thus, the HCI system solution database 706 may be considered the "single source of truth" for any particular HCI system solution infrastructure, and may include the supported HCI system platforms, as well as the available and supported components, and supported software (e.g., software, firmware, drivers, etc.) for each HCI system platform and its components. Furthermore, as new versions of any HCI system solution are created, the addition of components with HCI system platforms in a new version may be treated as alternative components if necessary. For example, a first version of an HCI system solution may include a mixed-use type of Solid State Drives (SSDs) with an HCI system platform, and a second version of the HCI system solution (e.g., due to a future revision or component end-of-life) may trigger a change to the HCI system solution such that those mixed-use type of SSDs are no longer available, and the second version of the HCI system solution may remove the mixed-use type of SSDs and add the alternative component. Thus, the HCI system solution database 706 may include information about what is supported as part of an HCI system solution, and information that provides a historical view into the HCI system platform(s) and/or component additions/removals (as HCI system platforms and their components will be provided several software versions during the lifecycle of that HCI system platform).

The method 800 then proceeds to block 804 where the HCI component expansion/replacement system receives a request for a new component type to be provided in an HCI system. In an embodiment, at block 804, the HCI component expansion/replacement engine 704 in the HCI component expansion/replacement system 606/700 may receive a request for a new component type to be provided in the HCI system 602 via its communication system 708. For example, with reference to FIG. 9A and in an embodiment of block 804, the HCI system 602 may perform new component type request operations 900 that include generating and transmitting a new component type request via the network 604 to the HCI component expansion/replacement system 606 such that the new component type request is received by the HCI component expansion/replacement engine 704 in the HCI component expansion/replacement system 606/700. However, while the new component type request is illustrated and described as being generated and transmitted by the HCI system for which the new component type is being requested, one of skill in the art in possession of the present disclosure will appreciate that the new component type request may be provided to the HCI component expansion/replacement system 606 from a variety of sources (i.e., other than the HCI system 602) that will fall within the scope of the present disclosure as well.

In some examples, the request for the new component to be added to the HCI system 602 may be part of an expansion of the HCI system 602, which one of skill in the art in possession of the present disclosure will appreciate may include the addition of server computing devices (and their components), switch computing devices (and their components), storage computing devices (and their components), any individual components for a server computing device, switch computing device, or storage computing device, and/or any other HCI system components that one of skill in the art in possession of the present disclosure would recognize as providing for an expansion of an HCI system. In other examples, the request for the new component to be added to the HCI system 602 may be part of a component replacement in the HCI system 602, which one of skill in the art in possession of the present disclosure will appreciate may include the replacement of server computing devices (and their components), switch computing devices (and their components), storage computing devices (and their components), any individual components for a server computing device, switch computing device, or storage computing device, and/or any other HCI system components that one of skill in the art in possession of the present disclosure would recognize as providing for a component replacement in an HCI system. However, while a few specific examples are provided, one of skill in the art in possession of the present disclosure will recognize that the teachings provided herein may be performed to add new components to an HCI system for any reason while remaining within the scope of the present disclosure.

Figure 9C:
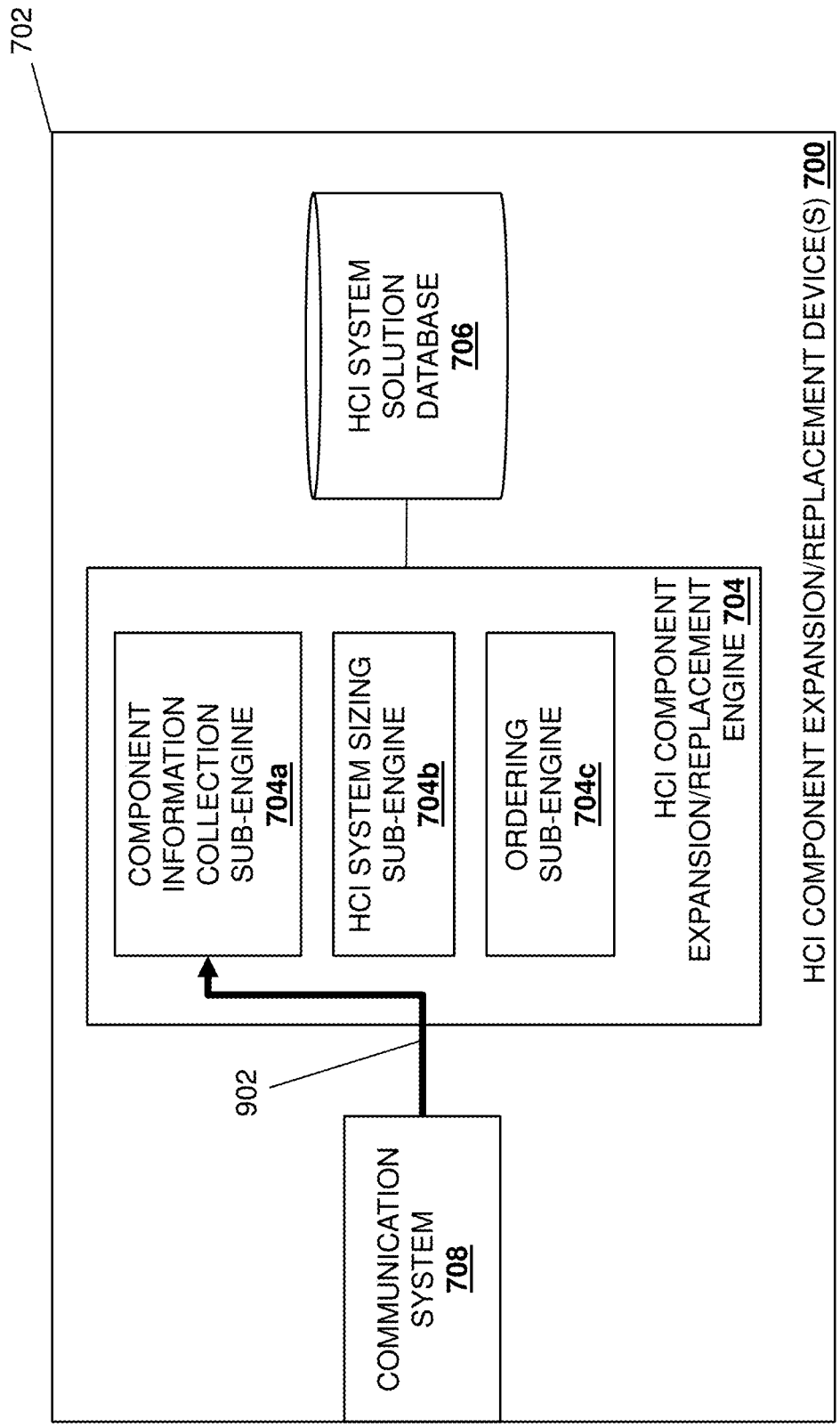
FIG. 9C is a schematic view illustrating an embodiment of the HCI component expansion/replacement system of FIG. 7 operating during the method of FIG. 8.

The method 800 then proceeds to block 806 where the HCI component expansion/replacement system retrieves existing component information from the HCI system. With reference to FIGS. 9B and 9C, in an embodiment of block 806, the component information collection sub-engine 704a in the HCI component expansion/replacement engine 704 of the HCI component expansion/replacement system 606/700 may perform component information retrieval operations 902 that may include any of a variety of communications with the switch computing device(s) 602*a*, the server computing device(s) 602*b*, the storage computing device(s) 602*c*, and/or any other components in the HCI system 602 in order to retrieve corresponding component information for existing components in the HCI system 602 through the network 604 via its communication system 708. As will be appreciated by one of skill in the art in possession of the present disclosure, the component information retrieved for the existing component in the HCI system 602 may include hardware inventory information, software inventory information, and/or any other component information associated with any components in the HCI system 602. As such, the component information retrieved at block 806 may include an HCI system platform identifier for the HCI system platform that includes the HCI system 602, component identifiers for existing components in the HCI system 602 (e.g., similarly to the "Intel SSDSC2KG960G8R", "TOSHIBA MG04ACA400NY", "Hitachi HUH721008ALE600", and "Seagate ST4000NM0265-2DC107" component identifiers discussed above), and software identifiers for software currently being used for components in the HCI system 602 (e.g., versions of software, firmware, and drivers for each component as described in the examples above). However, while specific examples are provided, one of skill in the art in possession of the present disclosure will appreciate that any of a variety of component information for the HCI system 602 may be retrieved at block 806 while remaining within the scope of the present disclosure.

Figure 9D:
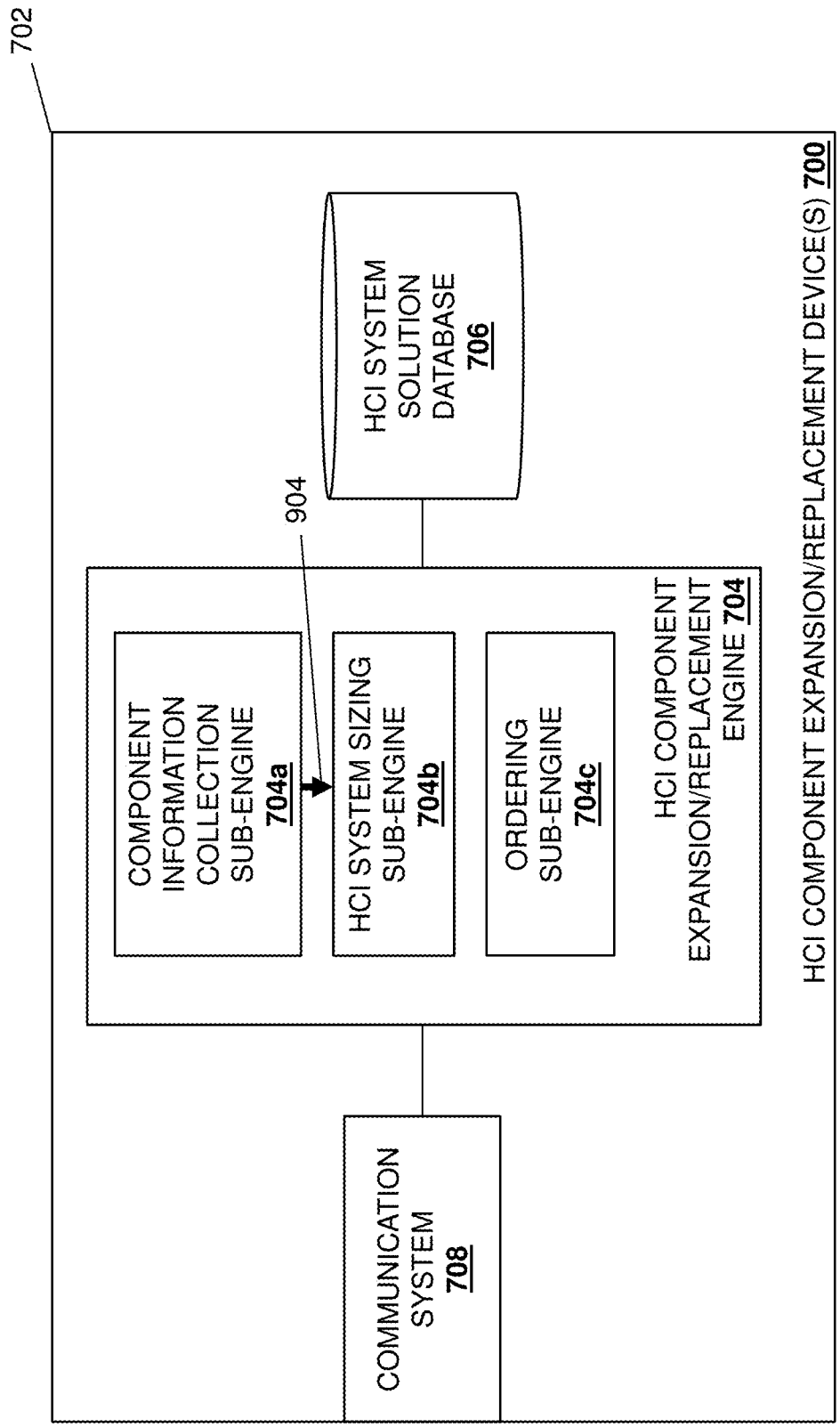
FIG. 9D is a schematic view illustrating an embodiment of the HCI component expansion/replacement system of FIG. 7 operating during the method of FIG. 8.
Figure 9E:
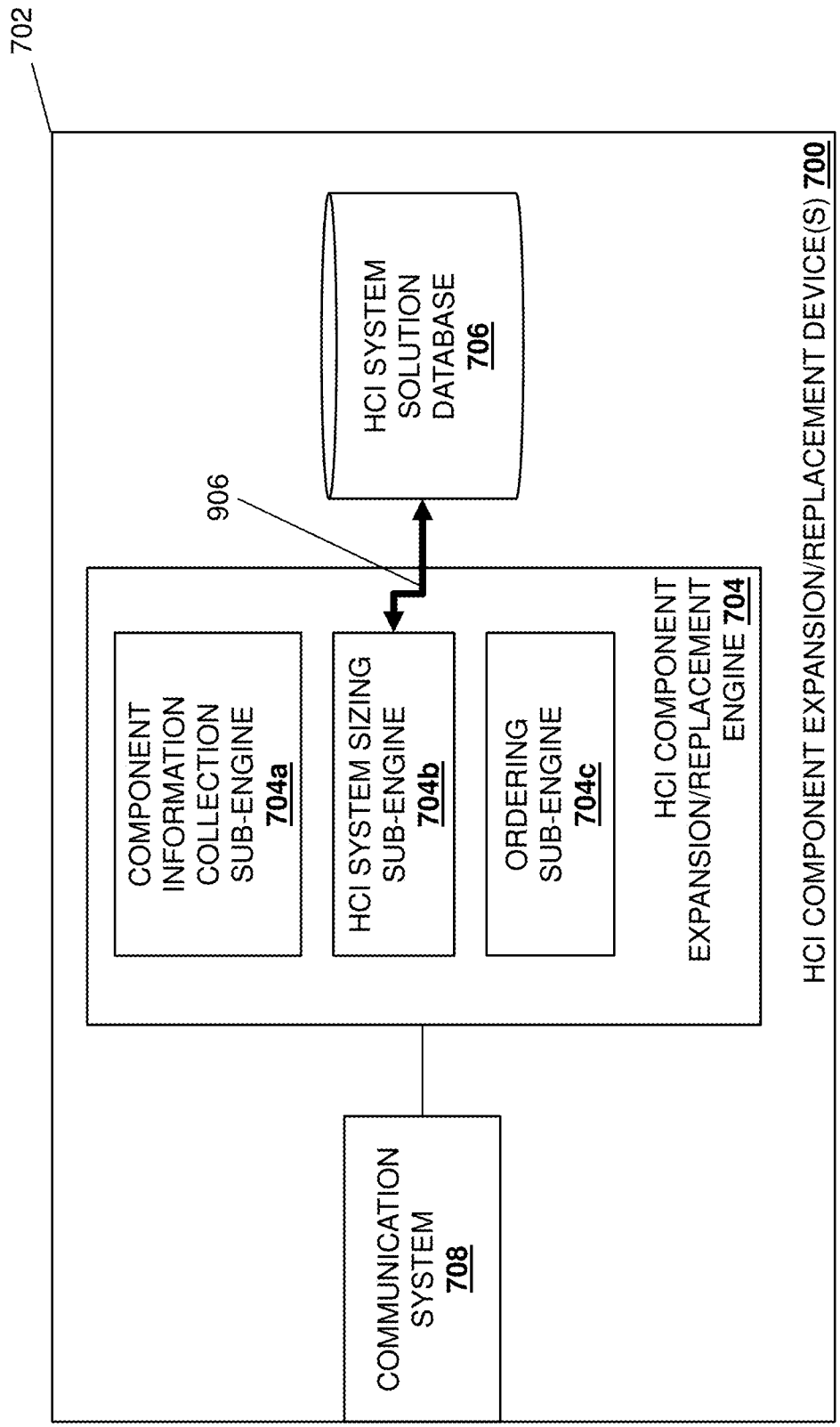
FIG. 9E is a schematic view illustrating an embodiment of the HCI component expansion/replacement system of FIG. 7 operating during the method of FIG. 8.

The method 800 then proceeds to block 808 where the HCI component expansion/replacement system uses the existing component information to identify a validated component that corresponds to the new component type and that is identified in the HCI system solution database for an HCI system platform that includes the HCI system. With reference to FIG. 9D, in an embodiment of block 808, the HCI system sizing sub-engine 704*b* in the HCI component expansion/replacement engine 704 of the HCI component expansion/replacement system 606/700 may perform existing component information access operations 904 to access the existing component information retrieved by the component information collection sub-engine 704*a*. With reference to FIG. 9E, in an embodiment of block 808, the HCI system sizing sub-engine 704*b* may perform HCI system solution database access operations 906 to identify a validated component corresponding to the new component type in the request received at block 804 (e.g., a validated storage device corresponding to a storage device type) that is identified in the HCI system solution database 706 for an HCI system platform that includes the HCI system 602, and that is compatible with the HCI system 602 and its components based on the existing component information retrieved at block 806.

In a specific example, the new component type request received at block 802 may be part of an expansion of storage devices in the HCI system 602, and thus may identify a storage device type for the purposes of the adding it to the existing components in the HCI system 602. The HCI system sizing sub-engine 704*b* may then use the existing component information for the HCI system 602 retrieved at block 806 to determine the HCI system platform that includes the HCI system 602, as well as the version of that HCI system platform providing the HCI system 602, and may access the HCI system solution database 706 to determine storage devices that are validated for that version of the HCI system platform ("validated storage devices"). In some embodiments, the HCI system sizing sub-engine 704*b* may then use the existing component information for the HCI system 602 to determine which of those validated storage devices are compatible with the existing components in the HCI system 602 ("compatible validated storage devices").

The HCI system sizing sub-engine 704*b* may then identify validated software for that version of the HCI system platform and the validated storage devices/compatible validated storage devices. In some embodiments, the HCI system sizing sub-engine 704*b* may then use the existing component information for the HCI system 602 to determine which of that validated software is compatible with the existing components in the HCI system 602 ("compatible validated software"). As such, one of skill in the art in possession of the present disclosure will recognize that the HCI component expansion/replacement system 606/700 may identify a new storage device for use in expanding the HCI system 602 that has been validated for use with that HCI system 602 and that is compatible with the components in that HCI system 602, and may identify software that has been validated for that HCI system and that new storage device and that is compatible with the components in that HCI system as well 602.

Thus, with reference to the initial component HCI system solution information and the software HCI system solution information provided in the example above, the new component type request may identify a storage device type for the purposes of the adding it to the existing components in the HCI system 602, and the HCI system sizing sub-engine 704*b* may determine that the existing component information for the HCI system 602 indicates that the HCI system 602 is configured according to version "1.0.0.0" of the HCI system platform "R740xd Storage Spaces Direct RN". The HCI system sizing sub-engine 704*b* may then access the initial component HCI system solution information in the HCI system solution database 706 to determine that "Intel SSDSC2KG960G8R", "TOSHIBA MG04ACA4000NY" and "Hitachi HUH721008ALE600" storage devices are validated for version "1.0.0.0" of the HCI system platform "R740xd Storage Spaces Direct RN", and identify one of those storage devices (e.g., the "Intel SSDSC2KG960G8R" storage device in the example below) for expanding the HCI system 602. The HCI component expansion/replacement engine 704 may also access the software HCI system solution information in the HCI system solution database 706 to determine that version "1.0.0.0" of the HCI system platform "R740xd Storage Spaces Direct RN" includes validated software version "2.3.0" for the "bios", validated software version "1.0.1" for the "cpld", and validated software version "3.26.26.26" for the "idrac"; while "Intel SSDSC2KG960G8R" storage devices for version "1.0.0.0" of the HCI system platform "R740xd Storage Spaces Direct RN" includes validated software version "10.18.0.19" for the "firmware", and "3.56.10" for the "driver".

Similarly, with reference to the second updated component HCI system solution information and the software HCI system solution information provided in the example above, the new component type request may identify a storage device type for the purposes of the adding it to the existing components in the HCI system 602, and the HCI system sizing sub-engine 704*b* may determine that the existing component information for the HCI system 602 indicates that the HCI system 602 is configured according to version "1.2.0.0" of the HCI system platform "R740xd Storage Spaces Direct RN". The HCI system sizing sub-engine 704*b* may then access the second updated component HCI system solution information in the HCI system solution database 706 to determine that "Intel SSDSC2KG960G8R", "TOSHIBA MG04ACA400NY", and "Seagate ST4000NM0265-2DC107" storage devices are validated for version "1.2.0.0" of the HCI system platform "R740xd Storage Spaces Direct RN", and identify one of those storage devices (e.g., the "Seagate ST4000NM0265-2DC107" storage device in the example below) for expanding the HCI system 602. The HCI system sizing sub-engine 704*b* may also access the software HCI system solution information in the HCI system solution database 706 to determine that version "1.2.0.0" of the HCI system platform "R740xd Storage Spaces Direct RN" includes validated software version "2.6.0" for the "bios", validated software version "1.1.0" for the "cpld", and validated software version "4.0.0.0" for the "idrac"; while "Seagate ST4000NM0265-2DC107" storage device for version "1.2.0.0" of the HCI system platform "R740xd Storage Spaces Direct RN" includes validated software version "20.0.0.0" for the "firmware", and "10.19.0.0" for the "driver".

In another specific example, the new component type request received at block 802 may be part of a replacement of a storage device in the HCI system 602, and thus may identify a storage device type for the purposes of replacing an existing (e.g., failed) storage device in the HCI system 602. The HCI system sizing sub-engine 704*b* may then use the existing component information for the HCI system 602 retrieved at block 806 to determine the HCI system platform that includes the HCI system 602, as well as the version of that HCI system platform providing the HCI system 602, and may access the HCI system solution database 706 to determine storage devices that are validated for that version of the HCI system platform ("validated storage devices"). In some embodiments, the HCI system sizing sub-engine 704*b* may then use the existing component information for the HCI system 602 to determine which of those validated storage devices are compatible with the existing components in the HCI system 602 ("compatible validated storage devices").

The HCI system sizing sub-engine 704*b* may then identify validated software for that version of the HCI system platform and the validated storage devices/compatible validated storage devices. In some embodiments, the HCI system sizing sub-engine 704*b* may then use the existing component information for the HCI system 602 to determine which of that validated software is compatible with the existing components in the HCI system 602 ("compatible validated software"). As such, one of skill in the art in possession of the present disclosure will recognize that the HCI component expansion/replacement system 606/700 may identify a new storage device for use in replacing an existing storage device the HCI system 602 that has been validated for use with that HCI system 602 and that is compatible with the components in that HCI system 602, and may identify software that has been validated for that HCI system and that new storage device and that is compatible with the components in that HCI system as well 602.

Thus, with reference to the initial component HCI system solution information and the software HCI system solution information provided in the example above, the new component type request may identify a storage device type for the purposes of replacing an existing storage device in the HCI system 602, and the HCI system sizing sub-engine 704*b* may determine that the existing component information for the HCI system 602 indicates that the HCI system 602 is configured according to version "1.0.0.0" of the HCI system platform "R740xd Storage Spaces Direct RN". The HCI system sizing sub-engine 704*b* may then access the initial component HCI system solution information in the HCI system solution database 706 to determine that "Intel SSDSC2KG960G8R", "TOSHIBA MG04ACA400NY" and "Hitachi HUH721008ALE600" storage devices are validated for version "1.0.0.0" of the HCI system platform "R740xd Storage Spaces Direct RN", and identify one of those storage devices for expanding the HCI system 602. In this storage-device-replacement example, the HCI system sizing sub-engine 704*b* may identify the validated storage device that is the same as the existing storage device (e.g., the "Intel SSDSC2KG960G8R" storage device in the example below) it will replace. The HCI system sizing sub-engine 704*b* may also access the software HCI system solution information in the HCI system solution database 706 to determine that version "1.0.0.0" of the HCI system platform "R740xd Storage Spaces Direct RN" includes validated software version "2.3.0" for the "bios", validated software version "1.0.1" for the "cpld", and validated software version "3.36.36.36" for the "idrac"; while "Intel SSDSC2KG960G8R" storage devices for version "1.0.0.0" of the HCI system platform "R740xd Storage Spaces Direct RN" includes validated software version "10.18.0.19" for the "firmware", and "3.56.10" for the "driver".

Similarly, with reference to the second updated component HCI system solution information and the software HCI system solution information provided in the example above, the new component type request may identify a storage device type for the purposes of replacing an existing storage device in the HCI system 602, and the HCI system sizing sub-engine 704*b* may determine that the existing component information for the HCI system 602 indicates that the HCI system 602 is configured according to version "1.2.0.0" of the HCI system platform "R740xd Storage Spaces Direct RN". The HCI system sizing sub-engine 704*b* may then access the second updated component HCI system solution information in the HCI system solution database 706 to determine that "Intel SSDSC2KG960G8R", "TOSHIBA MG04ACA4000NY", and "Seagate ST4000NM0265-2DC107" storage devices are validated for version "1.2.0.0" of the HCI system platform "R740xd Storage Spaces Direct RN", and identify one of those storage devices for expanding the HCI system 602. In this storage-device-replacement example, the HCI system sizing sub-engine 704*b* may identify the validated storage device (e.g., the "Seagate ST4000NM0265-2DC107" storage device in the example below) that is different than the existing storage device (e.g., the "Intel SSDSC2KG960G8R" storage device in the example below) it will replace due to, for example, unavailability of the existing storage device. The HCI system sizing sub-engine 704*b* may also access the software HCI system solution information in the HCI system solution database 706 to determine that version "1.2.0.0" of the HCI system platform "R740xd Storage Spaces Direct RN" includes validated software version "2.6.0" for the "bios", validated software version "1.1.0" for the "cpld", and validated software version "4.0.0.0" for the "idrac"; while "Seagate ST4000NM0265-2DC107" storage device for version "1.2.0.0" of the HCI system platform "R740xd Storage Spaces Direct RN" includes validated software version "20.0.0.0" for the "firmware", and "10.19.0.0" for the "driver".

Thus, when identifying a new component for an HCI system, the HCI component expansion/replacement system 606/700 verifies that any new component selected is in compliance with the components that are already included in that HCI system 602, and identify software for that new component that ensures that the new component will perform optimally and not create any performance or operational issues with the HCI system 602 and its components. As will be appreciated by one of skill in the art in possession of the present disclosure, the inclusion of older versions of HCI system platforms and their validated components ensures any new component identified for an HCI system based on existing components in that HCI system will be compatible with those existing component and provided validated software such that it is ready for use immediately after it is provided in that HCI system.

In some embodiment, following the identification of a new component for an HCI system, the HCI component expansion/replacement system 606/700 may verify (e.g., via the ordering sub-engine 704c in the HCI component expansion/replacement engine 704 of the HCI component expansion/replacement system 700) whether that new component is available for purchase) and, if not, may access the HCI system solution database 706 to identify an alternate component that has also been validated for that HCI system (e.g., the "TOSHIBA MG04ACA400NY" in place of the "Intel SSDSC2KG960G8R" for the first version "v1.0.0.0" of the HCI system platform "R740xd Storage Spaces Direct RN") as the new component for that HCI system. Furthermore, in the event a new component identified for an HCI system is not available and an alternate component that is validated for that HCI system cannot be identified, the HCI component expansion/replacement system 606/700 may attempt to identify a new component for a different version (e.g., a later version) of that HCI system. If no new component can be identified, the HCI component expansion/replacement system 606/700 may then inform a customer associated with the HCI system 602 that there are no recommendations available for new component that have validated with the HCI system 602.

Figure 9F:
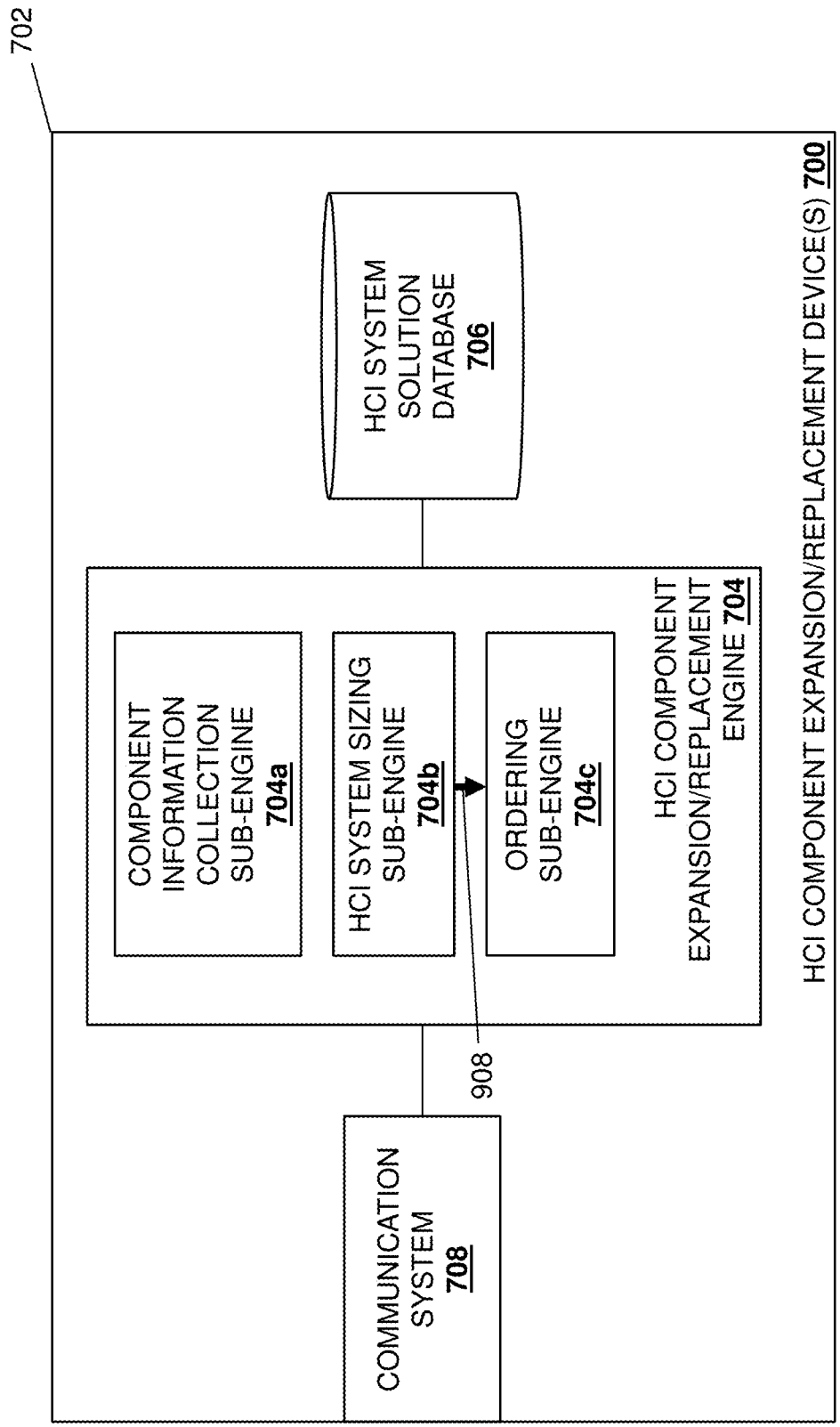
FIG. 9F is a schematic view illustrating an embodiment of the HCI component expansion/replacement system of FIG. 7 operating during the method of FIG. 8.

In some embodiments, the identification of the new component at block 808 may include determining whether the identified new component can be provided to the customer relatively quickly and, if not, an alternate new component may be identified that is associated with a minimized provisioning time. For example, in response to identifying a new component as discussed above, the HCI component expansion/replacement engine 704 in the HCI component expansion/replacement system 606/700 may determine a new component provisioning time for providing the new component to a customer associated with the HCI system 602. As illustrated in FIG. 9F, the HCI system sizing sub-engine 704b may then perform component provisioning time determination operations 906 to access the ordering sub-engine 704c in the HCI component expansion/replacement engine 704 of the HCI component expansion/replacement system 700 in order to determine whether that new component provisioning time exceeds a component provisioning time threshold. In the event that the new component provisioning time does not exceed the component provisioning time threshold, the new component may be recommended to the customer for provisioning in the HCI system 602. However, in the event that HCI system sizing sub-engine 704b determines that the new component provisioning time exceeds the component provisioning time threshold, the HCI system sizing sub-engine 704b may repeat block 808 substantially as discussed above to identify alternate new component(s) until a new component is identified that can be provided to the customer of the HCI system 602 in a component provisioning time does not exceed the component provisioning time threshold (or in the shortest available component provisioning time.)

As discussed above, following block 808, the HCI component expansion/replacement system 700 may provide a recommendation to a customer of the HCI system 602 that recommends the new component for expansion of the HCI system 602 or replacement of an existing component in the HCI system 602. As will be appreciated by one of skill in the art in possession of the present disclosure, the customer of the HCI system 602 may accept that new component recommendation, and the ordering sub-engine 704c in the HCI component expansion/replacement engine 704 of the HCI component expansion/replacement system 606/700 may then perform a variety of component provisioning operations in order to provide that new component for use with the HCI system 602. However, in the event the customer of the HCI system 602 does not accept the new component recommendation, the HCI component expansion/replacement engine 704 of the HCI component expansion/replacement system 606/700 may repeat block 808 of the method 800 to identify an alternate component(s) until the customer of the HCI system 602 accepts a corresponding new component recommendation, and then perform the component provisioning operations discussed above in order to provide that new component for use with the HCI system 602

The method 800 then proceeds to block 810 where the HCI component expansion/replacement system provides validated software identified in the HCI system solution database for the validated component to the HCI system. With reference to FIG. 9G, in an embodiment of block 810, the HCI component expansion/replacement engine 704 in the HCI component expansion/replacement system 606/700 may perform validated software transmission operations 910 to transmit the validated software for the new component (which was provided to the customer of the HCI system 602 following block 808) through the network 604 via its communication system 708 and to the HCI system 602. As such, a management subsystem in the HCI system 602 may receive the validated software and, upon connection of the new component to the HCI system 602, may install that validated software to configure the new component to operate as part of the HCI system 602. In a specific example, the provisioning of validated software with the new (validated) component provided for the HCI system 602 may include the HCI component expansion/replacement system 606/700 correlating the firmware version of the new component with the firmware versions of existing components in the HCI system 602 such that the HCI system 602 includes only software that has been validated for the HCI system platform that includes that HCI system, and the components included in that HCI system. While not discussed in detail herein, one of skill in the art in possession of the present disclosure will appreciate that the provisioning of new component(s) and software to an HCI system as discussed above may include the generation and transmission of a component Bill Of Material (BOM), a configuration manifest, and/or other hardware/software provisioning information known in the art, to the customer of that HCI system.

Thus, systems and methods have been described that provide for the consideration of current component configuration in an HCI system, along with components that have been validated to operate with an HCI system platform that includes that HCI system, when components are expanded or replaced in that HCI system. For example, the HCI component expansion/replacement system of the present disclosure may include HCI component expansion/replacement device(s) that periodically update an HCI system solution database to identify a plurality of validated components for an HCI system platform, and to identify validated software for each of the plurality of validated components. When the HCI component expansion/replacement system receives a request for a new component type to be provided in an HCI system, existing component information about a plurality of existing components that are included in the HCI system is retrieved and used to identify a first validated component that is identified in the HCI system solution database for the HCI system platform that includes that HCI system. The HCI system then provides the first validated software that is identified in the HCI system solution database for the first validated component to the HCI system. As such, the expansion or replacement of components in an HCI system may be automated in a manner that ensures that those components provide for optimal operation of that HCI system by considering the current inventory of an HCI system and components that are supported for that particular HCI system, and offering component alternatives if matching expansion or replacement components are not available.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
 a Hyper-Converged Infrastructure (HCI) system; and
 an HCI component expansion/replacement system that is coupled to the HCI system and that includes at least one hardware processor that is configured to:
  periodically update an HCI system solution database to identify a plurality of validated components for an HCI system platform that includes the HCI system, and to identify validated software for each of the plurality of validated components;
  receive a request for a new component type to be provided in the HCI system;
  retrieve, from the HCI system in response to receiving the request, existing component information about a plurality of existing components that are included in the HCI system;
  identify, in the HCI system solution database based on the existing component information, a first validated component that corresponds to the new component type and that is identified for the HCI system platform that includes the HCI system; and
  provide, to the HCI system, first validated software that is identified in the HCI system solution database for the first validated component.

2. The system of claim 1, wherein the request for the new component type to be provided in the HCI system includes a request for a new component to be added to the plurality of existing components that are included in the HCI system.

3. The system of claim 1, wherein the request for the new component type to be provided in the HCI system includes a request for a new component to replace a first existing component that is included in the HCI system.

4. The system of claim 1, wherein the periodic updating of the HCI system solution database to identify the plurality of validated components for the HCI system platform that includes the HCI system includes:
 periodically adding identifications of validated components for the HCI system platform to the HCI system solution database; and
 periodically removing identifications of validated components for the HCI system platform from the HCI system solution database.

5. The system of claim 1, wherein the periodic updating of the HCI system solution database to identify validated software for each of the plurality of validated components includes:
 periodically adding identifications of validated software for validated components for the HCI system platform to the HCI system solution database; and
 periodically removing identifications of validated software for validated components for the HCI system platform to the HCI system solution database.

6. The system of claim 1, wherein the identifying the first validated component includes:
 determining that the first validated component is compatible with the existing components in the HCI system; and
 determining that the validated software for the validated component does not create performance issues with existing software for the existing components in the HCI system.

7. An Information Handling System (IHS), comprising:
 a processing system; and
 a memory system that is coupled to the processing system and that includes instructions that, when executed by the processing system, cause the processing system to provide a Hyper-Converged Infrastructure (HCI) component expansion/replacement engine that is configured to:
  periodically update an HCI system solution database to identify a plurality of validated components for an HCI system platform that includes an HCI system, and to identify validated software for each of the plurality of validated components;
  receive a request for a new component type to be provided in the HCI system;
  retrieve, from the HCI system in response to receiving the request, existing component information about a plurality of existing components that are included in the HCI system;
  identify, in the HCI system solution database based on the existing component information, a first validated component that corresponds to the new component type and that is identified for the HCI system platform that includes the HCI system; and
  provide, to the HCI system, first validated software that is identified in the HCI system solution database for the first validated component.

8. The IHS of claim 7, wherein the request for the new component type to be provided in the HCI system includes a request for a new component to be added to the plurality of existing components that are included in the HCI system.

9. The IHS of claim 7, wherein the request for the new component type to be provided in the HCI system includes a request for a new component to replace a first existing component that is included in the HCI system.

10. The IHS of claim 7, wherein the periodic updating of the HCI system solution database to identify the plurality of validated components for the HCI system platform that includes the HCI system includes:
 periodically adding identifications of validated components for the HCI system platform to the HCI system solution database; and periodically removing identifications of validated components for the HCI system platform from the HCI system solution database.

11. The IHS of claim 7, wherein the periodic updating of the HCI system solution database to identify validated software for each of the plurality of validated components includes:
periodically adding identifications of validated software for validated components for the HCI system platform to the HCI system solution database; and
periodically removing identifications of validated software for validated components for the HCI system platform to the HCI system solution database.

12. The IHS of claim 7, wherein the identifying the first validated component includes:
determining that the first validated component is compatible with the existing components in the HCI system; and
determining that the validated software for the validated component does not create performance issues with existing software for the existing components in the HCI system.

13. The IHS of claim 7, wherein the HCI system solution database includes:
a first HCI solution version identifying a plurality of first validated components for the HCI system platform that includes the HCI system; and
a second HCI solution version identifying at least one second validated component for the HCI system platform that includes the HCI system, wherein the at least one second validated component is not included in the first HCI solution version.

14. A method for expanding/replacing components in a Hyper-Converged Infrastructure (HCI) system, comprising:
periodically updating, by an Hyper-Converged Infrastructure (HCI) component expansion/replacement system, an HCI system solution database to identify a plurality of validated components for an HCI system platform that includes an HCI system, and to identify validated software for each of the plurality of validated components;
receiving, by the HCI component expansion/replacement system, a request for a new component type to be provided in the HCI system;
retrieving, by the HCI component expansion/replacement system from the HCI system in response to receiving the request, existing component information about a plurality of existing components that are included in the HCI system;
identifying, by the HCI component expansion/replacement system in the HCI system solution database based on the existing component information, a first validated component that corresponds to the new component type and that is identified for the HCI system platform that includes the HCI system; and providing, by the HCI component expansion/replacement system to the HCI system, first validated software that is identified in the HCI system solution database for the first validated component.

15. The method of claim 14, wherein the request for the new component type to be provided in the HCI system includes a request for a new component to be added to the plurality of existing components that are included in the HCI system.

16. The method of claim 14, wherein the request for the new component type to be provided in the HCI system includes a request for a new component to replace a first existing component that is included in the HCI system.

17. The method of claim 14, wherein the periodic updating of the HCI system solution database to identify the plurality of validated components for the HCI system platform that includes the HCI system includes:
periodically adding identifications of validated components for the HCI system platform to the HCI system solution database; and
periodically removing identifications of validated components for the HCI system platform from the HCI system solution database.

18. The method of claim 14, wherein the periodic updating of the HCI system solution database to identify validated software for each of the plurality of validated components includes:
periodically adding identifications of validated software for validated components for the HCI system platform to the HCI system solution database; and
periodically removing identifications of validated software for validated components for the HCI system platform to the HCI system solution database.

19. The method of claim 14, wherein the identifying the first validated component includes:
determining that the first validated component is compatible with the existing components in the HCI system; and
determining that the validated software for the validated component does not create performance issues with existing software for the existing components in the HCI system.

20. The method of claim 14, wherein the HCI system solution database includes:
a first HCI solution version identifying a plurality of first validated components for the HCI system platform that includes the HCI system; and
a second HCI solution version identifying at least one second validated component for the HCI system platform that includes the HCI system, wherein the at least one second validated component is not included in the first HCI solution version.

* * * * *